United States Patent
Woytowitz

(10) Patent No.: US 11,871,710 B2
(45) Date of Patent: Jan. 16, 2024

(54) WIRELESS VALVE CONTROL

(71) Applicant: Hunter Industries, Inc., San Marcos, CA (US)

(72) Inventor: Peter John Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 17/444,319

(22) Filed: Aug. 3, 2021

(65) Prior Publication Data

US 2021/0360884 A1 Nov. 25, 2021

Related U.S. Application Data

(63) Continuation-in-part of application No. 16/781,299, filed on Feb. 4, 2020, now abandoned.

(60) Provisional application No. 62/801,294, filed on Feb. 5, 2019.

(51) Int. Cl.
| | |
|---|---|
| *A01G 25/16* | (2006.01) |
| *A01G 25/06* | (2006.01) |
| *H04L 1/1607* | (2023.01) |
| *H04L 67/125* | (2022.01) |
| *H04W 4/80* | (2018.01) |

(52) U.S. Cl.
CPC ........... *A01G 25/165* (2013.01); *A01G 25/06* (2013.01); *H04L 1/1607* (2013.01); *H04L 67/125* (2013.01); *H04W 4/80* (2018.02)

(58) Field of Classification Search
CPC .... A01G 25/165; A01G 25/06; H04L 1/1607; H04L 67/125; H04W 4/80; G05B 2219/2625; G05B 19/042
See application file for complete search history.

(56) References Cited

U.S. PATENT DOCUMENTS

| | | |
|---|---|---|
| 7,257,465 B2 | 8/2007 | Perez et al. |
| 7,286,004 B2 | 10/2007 | Inoue |
| 7,444,207 B2 | 10/2008 | Nickerson et al. |
| 7,558,650 B2 | 7/2009 | Thornton et al. |
| 7,996,115 B2 | 8/2011 | Nickerson et al. |
| 8,185,248 B2 | 5/2012 | Ensworth et al. |
| 8,504,210 B2 | 8/2013 | Ensworth et al. |
| 8,868,246 B2 | 10/2014 | Thornton et al. |
| 9,244,449 B2 | 1/2016 | Tennyson et al. |
| 9,320,205 B2 | 4/2016 | Ensworth et al. |

(Continued)

*Primary Examiner* — Chad G Erdman
(74) *Attorney, Agent, or Firm* — Knobbe, Martens, Olson & Bear, LLP

(57) ABSTRACT

An irrigation communicates wirelessly with irrigation control valves. A wireless controller transceiver unit obtains signals from the irrigation controller and transmits these signals wirelessly to a valve transceiver. The irrigation control valves open or close according to the signals received by the valve transceiver. The irrigation system also includes an auxiliary communication device that communicates user commands to the controller transceiver. The user commands are used to create associations between the controller transceiver and each of the valve transceivers. The communication link between the auxiliary communication device and the communication transceiver or the valve transceiver can be an RF communication link such as Bluetooth, a close field communication link such as an inductive communication link, or an optical communication link.

19 Claims, 26 Drawing Sheets

(56) References Cited

U.S. PATENT DOCUMENTS

| | | | |
|---|---|---|---|
| 10,194,599 B2 | 2/2019 | Ensworth et al. | |
| 10,201,133 B2 | 2/2019 | Tennyson et al. | |
| 10,582,673 B2 | 3/2020 | Nickerson et al. | |
| 10,663,941 B2 | 5/2020 | Nickerson et al. | |
| 10,772,267 B2 | 9/2020 | Tennyson et al. | |
| 11,053,668 B1 * | 7/2021 | Manning | E03B 7/003 |
| 2011/0196541 A1 * | 8/2011 | Bauman | G05D 7/06 |
| | | | 700/3 |
| 2013/0173070 A1 * | 7/2013 | Tennyson | G05B 19/02 |
| | | | 700/284 |
| 2015/0060562 A1 | 3/2015 | Christianson | |
| 2016/0198647 A1 * | 7/2016 | Wang | H04W 4/80 |
| | | | 700/284 |
| 2017/0318761 A1 | 11/2017 | Rainone et al. | |
| 2018/0048987 A1 * | 2/2018 | Morris | H04B 5/0031 |
| 2020/0379491 A1 * | 12/2020 | Wilson, IV | G05D 16/2013 |

* cited by examiner

| Bit7 | | | | | | | Bit0 |
|------|-----|-----|-----------|-----|-----|-----|-----|
| OFF | ST7 MSB | ST6 | RF5 MSB | RF4 | RF3 | RF2 | RF1 |
| Activate On ||||||||

*FIG. 22*

| Bit7 | | | | | | | Bit0 |
|------|-----|-----|-----------|-----|-----|-----|-----|
| OFF | ST7 MSB | ST6 | RF5 MSB | RF4 | RF3 | RF2 | RF1 |
| Activate Off ||||||||

WIRELESS VALVE CONTROL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present invention relates to residential and commercial irrigation control valves, and more particularly, to a solenoid actuated valve controlled by wireless communication.

BACKGROUND

Irrigation control valves can include solenoid valves to control the flow of water in an irrigation system. In general, a solenoid valve is an electromechanical device in which a cylindrically wound coil of wire uses an electric current to generate a magnetic field which moves a mechanism that opens or closes an opening in the valve body to control the flow of fluid through a valve body. An irrigation controller can provide control signals to control the solenoid valve. In conventional irrigation systems, trenches are dug and wire is laid from irrigation controller to the irrigation control valves and signals from the irrigation controller traveling over the wires to the irrigation control valves can control the state of the solenoid valve.

SUMMARY

In many irrigation systems there is a demand to quickly and easily install wireless irrigation control valves without the cost and effort associated with digging trenches and laying wire.

A wireless irrigation system installation uses subterranean pipes to deliver water and eliminates the need to trench to lay extra wires for the irrigation control valves. A wireless irrigation system can include a conventional irrigation controller that is configured to provide control signals for wired connections to the irrigation control valves, and a controller transceiver that is configured to convert the set of wired control signals to a set of wireless control signals.

The wireless irrigation system further includes one or more wireless irrigation control valves. The wireless irrigation control valve can include a valve transceiver that is configured to convert the set of wireless control signals from the controller transceiver to wired control signals for wired connections and a wired irrigation control valve that is configured to receive the wired control signals from the valve transceivers to control the flow of water through the valve bodies and into the subterranean pipes.

In some aspects, the wireless irrigation control signals need to travel great distances. Several problems can arise when converting a wired set of signals into a wireless set of signals that need to travel great distances including multipath issues, interference from nearby radio frequency (RF) or noisy sources, and loss or degradation of signal due to buildings, landscape features or distance. The distance the wireless signal can travel is governed primarily by the strength of the transmitted signal, the sensitivity of the transceiver, the gain (or loss) of the antenna, and the losses in the transmission path. To a limited degree, the usage of modulation techniques and error correction codes can give an effective boost to the effective signal. Using spread spectrum techniques can not only aid the effective sensitivity but also aid in multipath problems and nearby noise sources. The tradeoff is with the effect of the spread spectrum techniques on overall data rate.

A wireless irrigation control valve will typically use a battery at the valve end to provide power to energize the solenoid and to operate the circuitry of the valve transceiver. To avoid frequent battery replacement, effective battery management of current consumption is essential. Power planning and limited use of on-air radio time can provide years of effective battery life while still delivering timely irrigation events.

The wireless irrigation system further includes an auxiliary communication device to communicate with controller transceiver. In an aspect, the auxiliary communication device includes a remote user interface. The auxiliary communication device can be used to communicate user commands to the controller transceiver. In some aspects, the user commands are used to create associations between the controller transceiver and each of the valve transceivers. In other aspects, the auxiliary communication device can communicate with the valve transceiver. The communication link between the auxiliary communication device and the communication transceiver or the valve transceiver can be, for example, a short range RF communication link such as Bluetooth®, a close field communication link such as an inductive communication link, or an optical communication link.

In certain aspects, the present disclosure relates to an irrigation system comprising an irrigation controller configured to provide one or more valve activation signals, each valve activation signal configured to control an associated irrigation valve; a valve transceiver configured to control a selected irrigation valve; and a controller transceiver configured to receive a selected activation signal of the one or more valve activation signals, the selected activation signal configured to control the selected irrigation valve. The controller transceiver comprises a wireless transceiver in communication, over a wireless communication link, with the valve transceiver; a short-range radio frequency communication module in communication, over a short-range radio frequency communication link, with an auxiliary communication device; and a processor and memory, the processor configured to execute computer instructions stored in the memory to receive a first message over the short-range radio frequency communication link from the auxiliary communication device, the message including an indication associated with a selected valve activation signal of the one or more valve activation signals; and transmit a second message that includes the indication associated with the selected valve activation signal over the wireless communication link to the valve transceiver, wherein the valve transceiver is further configured to create an association between the selected irrigation valve and the selected activation signal.

In a number of aspects, the irrigation controller provides the selected activation signal, and the controller transceiver is configured to transmit, over the wireless communication link, a third message that includes the indication of the selected activation signal to cause the valve transceiver to control the associated irrigation valve. In several aspects, the valve transceiver is configured to receive, over the wireless communication link, the third message, decode the message, and control the associated irrigation valve responsive to the decoded message. In some aspects, the auxiliary communication comprises a mobile communication device with a user interface. In various aspects, the short-range radio frequency communication link between the controller transceiver and the auxiliary communication device is bi-directional. In some aspects, the wireless communication link between the controller transceiver and the valve transceiver is bi-directional.

In some aspects, the present disclosure related to a controller transceiver comprising a wireless transceiver configured to be in communication with a valve transceiver over a wireless communication link, the valve transceiver configured to control a selected irrigation valve; a short-range radio frequency communication module configured to be in communication with an auxiliary communication device over a short-range radio frequency communication link; and a processor and memory, the processor configured to execute computer instructions stored in the memory to receive one or more valve activation signals from an irrigation controller, each valve activation signal configured to control an associated irrigation valve; receive a first message over the short-range radio frequency communication link from the auxiliary communication device, the message including an indication associated with a selected activation signal of the one or more valve activation signals; and transmit a second message that includes the indication associated with the selected activation signal over the wireless communication link to the valve transceiver.

In certain aspects, the valve transceiver is further configured to create an association between the selected irrigation valve and the selected activation signal. In various aspects, when the irrigation controller provides the selected activation signal, the controller transceiver is configured to transmit, over the wireless communication link, a third message that includes the indication of the selected activation signal to cause the valve transceiver to control the associated irrigation valve. In a number of aspects, the valve transceiver is configured to receive, over the wireless communication link, the third message, decode the message, and control the associated irrigation valve responsive to the decoded message.

In certain aspects, the present disclosure relates to an irrigation system comprising an irrigation controller configured to provide one or more valve activation signals, each valve activation signal configured to control an associated irrigation valve; a valve transceiver configured to control a selected irrigation valve; and a controller transceiver configured to receive, from the irrigation controller, a selected activation signal of the one or more valve activation signals. The selected activation signal is configured to control the selected irrigation valve, and the controller transceiver comprises a wireless transceiver in communication, over a wireless communication link, with the valve transceiver; a short-range radio frequency communication module in communication, over a short-range radio frequency communication link, with an auxiliary communication device; and a processor and memory, the processor configured to execute computer instructions stored in the memory to exchange first messages over the short-range radio frequency communication link with the auxiliary communication device.

In various aspects, the first messages include commands from the auxiliary communication device. In some aspects, the commands include one or more of a request for battery status of the valve transceiver unit, a request for integrity status of the wireless communication link, or a request to download firmware. In certain aspects, the processor is further configured to execute the computer instructions to exchange second messages over the wireless communication link with the valve transceiver.

In certain aspects, the present disclosure relates to a method for irrigation control. The method comprises providing, from an irrigation controller, one or more valve activation signals, each valve activation signal configured to control an associated irrigation valve; receiving, at a controller transceiver, a first message over a short-range radio frequency communication link from an auxiliary communication device, the message including an indication associated with a selected activation signal of the one or more valve activation signals; transmitting a second message that includes the indication associated with the selected valve activation signal over a wireless communication link to a valve transceiver that controls a selected irrigation valve; and associating the selected valve activation signal with the selected irrigation valve.

In certain aspects, the valve transceiver is further configured to create the association between the selected irrigation valve and the selected activation signal. In a number of aspects, the method further comprises storing, at the controller transceiver, the association. In certain aspects, the method further comprises receiving at the controller transceiver the selected activation signal from the irrigation controller. In various aspects, the method further comprises transmitting, after receiving the selected activation signal from the irrigation controller, a command to the valve transceiver over the wireless communication link, the command including the indication associated with the selected activation signal. In several aspects, the method further comprises, at the valve transceiver, decoding the command and controlling the associated irrigation valve responsive to the decoded command.

BRIEF DESCRIPTION OF THE DRAWINGS

Embodiments of this disclosure will now be described, by way of non-limiting example, with reference to the accompanying drawings.

FIG. 22 illustrates the activate ON message format for the wireless communication in accordance with an embodiment.

FIG. 23 illustrates the activate OFF message format for the wireless communication in accordance with an embodiment.

DETAILED DESCRIPTION OF CERTAIN EMBODIMENTS

Figure 1:
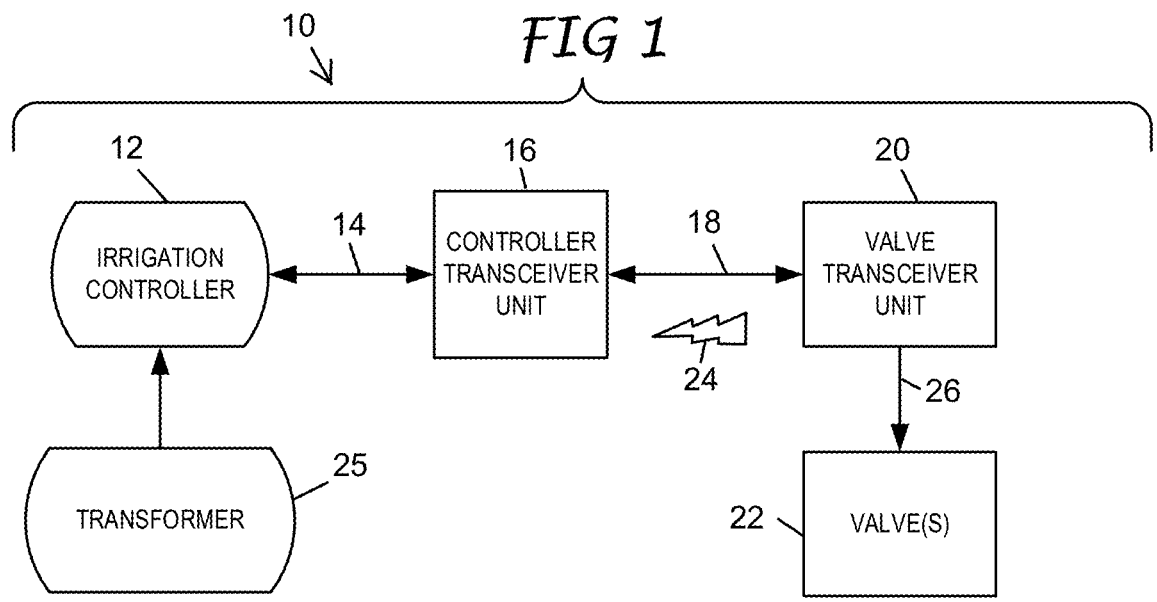
FIG. 1 is a simplified block diagram of a wireless irrigation system with wireless irrigation control valves in accordance with an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects of this disclosure are related to cost saving measures for irrigation system users to add irrigation control valves easily without the need for placing wires into the ground. The wireless systems disclosed are robust alternatives to wired irrigation systems and can be seamlessly integrated to be transparent to the user.

Wireless Irrigation Systems

FIG. 1 illustrates an example irrigation system 10 that is configured to wirelessly transmit irrigation control signals from an irrigation controller 12, such as a conventional irrigation controller that is configured to provide irrigation control signals over a wired physical connection, to one or more irrigation control valves 22 that are configured to receive the irrigation control signals over the wired physical connection, without providing the physical connection between the irrigation controller 12 and the irrigation control valves 22.

In the illustrated embodiment, the irrigation system 10 comprises the irrigation controller 12, a transformer 25 configured to supply power to the irrigation controller 12, a controller transceiver unit 16, a valve transceiver unit 20, and the irrigation control valve 22.

The irrigation controller 12 is configured to receive user input directed to a watering schedule and provide signals configured to control landscape irrigation in response to the user input. In an embodiment, the irrigation controller 12 is configured to provide electrical signals over a physical connection 14 to the controller transceiver unit 16, which converts the electrical signals from the irrigation controller 12 to radio-frequency (RF) signals that are sent to the valve transceiver unit 20 over a wireless link 24. The valve transceiver unit 20 converts the RF signals to electrical signals in a format that is usable to the irrigation control valve 22 and sends the electrical signals over the wired physical connection 26 to the irrigation control valve 22 to control the opening and closing of the valve body according to the watering schedule. In combination, the valve transceiver unit 20 and the irrigation control valve 22 comprise a wireless irrigation control valve.

In an aspect, the controller transceiver unit 16 can be in electrical communication with the irrigation controller 12 via the physical connection 14, can be in electrical communication with the valve transceiver unit 20 via the physical connection 18, and can be in wireless communication with the valve transceiver unit 20 via a wireless link 24. The valve transceiver unit 20 can be in electrical communication with the irrigation control valve 22 via the physical connection 26. The irrigation control valves 22 typically include solenoids which open and close to control the flow of water. The solenoids are controlled by the signals originating from the irrigation controller 12 and sent to the valves 22 via the controller transceiver unit 16 and the valve transceiver unit 20.

Transformer 25 can be configured to provide power to the irrigation controller 12. In some embodiments the transformer 25 can plug into a standard household 115 volt AC or 230 volt AC outlet and supply twenty-four volt AC power to the irrigation controller 12. In some embodiments, the transformer 25 can be mounted internally in the irrigation controller 12 and be electrically connected to 115 volt or 230 volt power at the property.

In an embodiment, the irrigation controller 12 is in electrical communication with the controller transceiver unit 16 via the physical connection 14 comprising at least one wire or wire harness. In some embodiments, the physical connection 14 can be a cable that can include copper wires so that power can be supplied to the controller transceiver unit 16. In some embodiments, data and commands can be sent on the same copper wires or on other copper wires in the physical connection 14.

In some embodiments the controller transceiver unit 16 can be mounted externally to the irrigation controller 12. In some embodiments, the controller transceiver unit 16 can be mounted internally within the irrigation controller 12. In some embodiments, the controller transceiver unit 16 plugs into a receptacle inside the irrigation controller 12 and makes electrical connection with the irrigation controller 12 at the receptacle. The controller 12 and controller transceiver unit 16 can be mounted in a garage or other protected location. In some embodiments, the controller 12 and controller transceiver unit 16 can have a waterproof construction that allows them to be mounted outside.

In an embodiment, the irrigation system 10 employs a wireless communication link 24 between the controller transceiver unit 16 and the valve transceiver unit 20. The irrigation system 10 may also employ other wired or other physical connections 18 for sending data and commands to the valve transceiver unit 20. In some embodiments the physical connection 18 can be a fiber optic cable.

The valve transceiver unit 20 is in electrical communication with the irrigation control valve 22 via the physical connection 26 that can include a cable. In some embodiments, a valve transceiver unit 20 can comprise a battery to provide power to the valve transceiver unit 20 and to operate the irrigation control valve 22. The valve transceiver unit 20 is typically mounted to a valve box lid or similar subterranean junction box containing the irrigation control valve 22 and wiring necessary to interface to the irrigation control valve 22 and its solenoid. The irrigation control valves 22 are typically mounted to subterranean pipes delivering water to the irrigated area. In some embodiments, the cable 26 can provide power to operate the solenoids in the irrigation control valves 22.

Figure 2:
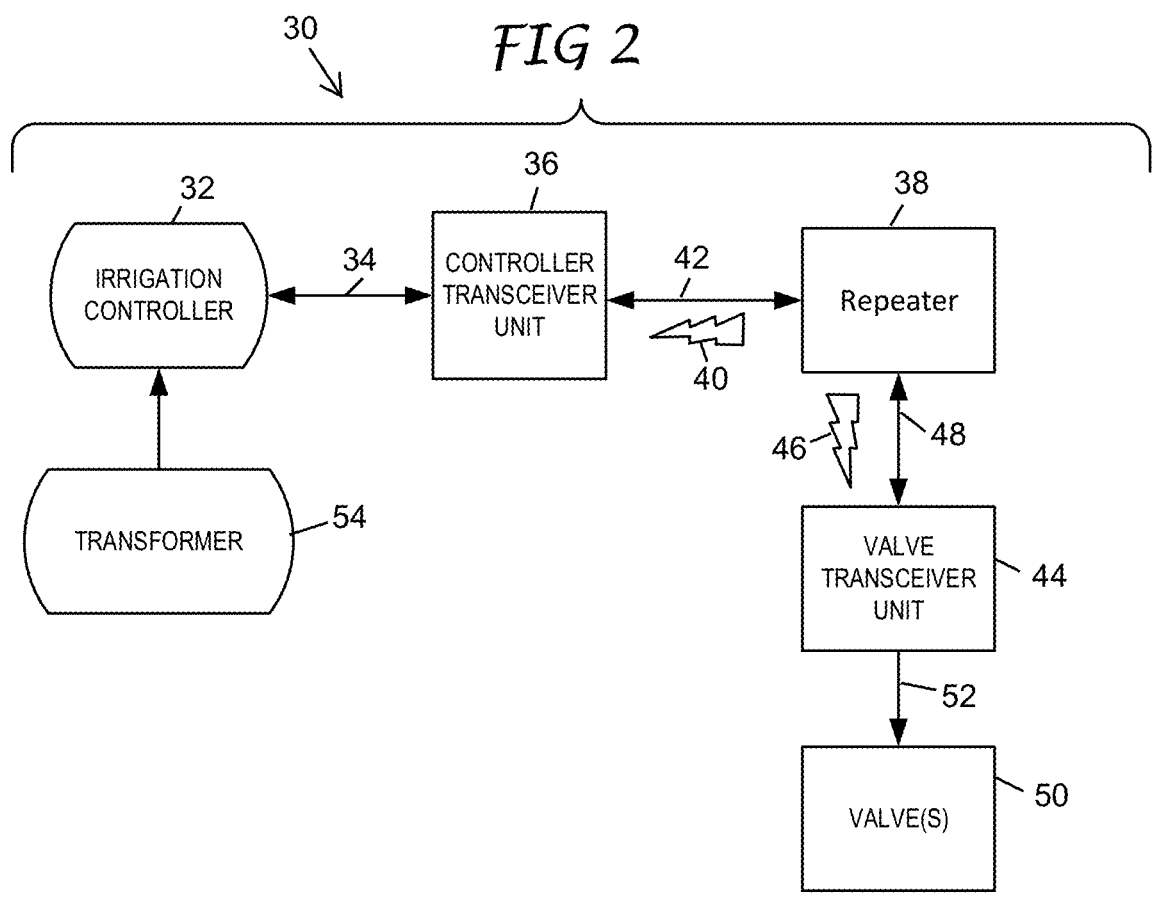
FIG. 2 is a simplified block diagram of another wireless irrigation system with a signal repeater and wireless irrigation control valves in accordance with another embodiment.

FIG. 2 illustrates another embodiment of an irrigation system 30 that is configured to wirelessly transmit irrigation control signals from an irrigation controller 32, such as a conventional irrigation controller that is configured to provide irrigation control signals over a physical connection, to one or more irrigation control valves 50 that are configured to receive the irrigation control signals over the physical connection, without providing the physical connection between the irrigation controller 32 and the irrigation control valves 50.

In the illustrated embodiment, the irrigation system 30 comprises the irrigation controller 32, a transformer 54 configured to supply power to the irrigation controller 32, a controller transceiver unit 36, a repeater 38, a valve transceiver unit 44 and the irrigation control valve 50.

The irrigation controller 32 is configured to receive user input directed to a watering schedule and provide signals configured to control landscape irrigation in response to the user input. In an embodiment, the irrigation controller 32 is configured to provide electrical signals over a physical connection 34 to the controller transceiver unit 36, which converts the electrical signals from the irrigation controller 32 to radio-frequency (RF) signals that are sent to the repeater 38 over a wireless link 40. The RF signals are received by the repeater 38 and sent to the valve transceiver unit 44 over a wireless link 46. The valve transceiver unit 44 converts the RF signals to electrical signals in a format that is usable to the irrigation control valve 50 and sends the electrical signals over the wired physical connection 52 to the irrigation control valve 50 to control the opening and closing of the valve body according to the watering schedule. In combination, the valve transceiver unit 44 and the irrigation control valve 50 comprise a wireless irrigation control valve.

In an aspect, the controller transceiver unit 36 can be in electrical communication with the irrigation controller 32 via a physical connection 34, can be in electrical communication with the repeater 38 via a physical connection 42, and can be in wireless communication with repeater 38 via the wireless link 40. The repeater 38 can be in electrical communication via a physical connection 48 and in wireless communication via the wireless link 46 with the valve transceiver unit 44. The valve transceiver unit 44 can be in electrical communication with the irrigation control valve 50 via the physical connection 52. The irrigation control valves 50 typically include solenoids which open and close to control the flow of water. The solenoids are controlled by the signals originating from the irrigation controller 32 and sent to the irrigation control valves 50 via the controller transceiver unit 36, the repeater 38, and the valve transceiver unit 44.

The irrigation system 30 is like the irrigation system 10 of FIG. 1, except the irrigation system 30 includes one or more repeaters 38. In some instances, obstacles and or excessive distance between the control transceiver unit 36 and the valve transceiver unit 44 can diminish the ability for reliable communications between them. In some embodiments, one or more repeaters 38 can enhance the communication between the controller transceiver unit 36 and the valve transceiver unit 44.

In an embodiment, the controller transceiver unit 36 employs the wireless communication link 40 between the controller transceiver unit 36 and the repeater 38. In some embodiments the irrigation system 30 can employ other wired or other physical connections 42 for sending data and commands. In some embodiments, the physical connection 42 can be a fiber optic cable. In an embodiment, the repeater 38 employs a wireless communication link 46 between the repeater 38 and the valve transceiver unit 44. The irrigation system 30 may also employ other wired or other physical connections 48 for sending data and commands. In some embodiments, the physical connection 48 can be a fiber optic cable.

In some embodiments the controller transceiver unit 36 can be mounted externally to the irrigation controller 32 using at least one wire, or wire harness 34. In some embodiments, the controller transceiver unit 36 can be mounted internally within the irrigation controller 32. In some embodiments, the controller transceiver unit 36 plugs into a receptacle inside the irrigation controller 32 and makes electrical connection at the receptacle. The irrigation controller 32 and controller transceiver unit 36 can be mounted in a garage or other protected location. In some embodiments they can have a waterproof construction that allows them to be mounted out of doors. Irrigation control valves 50 are typically mounted to subterranean pipes delivering water to the irrigated area.

In some embodiments the transformer 54 can plug into a standard household 115 volt AC or 230 volt AC outlet and supply twenty-four volt AC power to the irrigation controller 32. In some embodiments, the transformer 54 can be mounted internally in the irrigation controller 32 and be electrically connected to 115 volt or 230 volt power at the property. A valve transceiver unit 44 is typically mounted to a valve box lid or similar subterranean junction box containing the valves and wiring necessary to interface to the valves and solenoids. In some embodiments, cable 34 can include copper wires so that power can be supplied to the controller transceiver unit 36. In some embodiments data and commands can be sent on the same copper wires or on other copper wires in the cable 34. In some embodiments cable 52 can include copper wires so that power can be supplied to the irrigation control valves 50.

Wireless Links

Referring to FIGS. 1 and 2, the controller unit transceiver 16, 36, the valve transceiver unit 20, 44, and the repeater 38, can implement a transceiver integrated circuit employing Long Range technology to form the wireless links 24, 40, and 46. In an aspect, the Long Range (LoRa) technology is implemented at the physical (PHY) layer in the seven-layer OSI model of computer networking. As is known to one of skill in the art of computer networking, the physical layer or layer 1 of the seven-layer OSI model is the first and lowest layer. The implementation of this layer is often termed PHY. The physical layer consists of the basic networking hardware transmission technologies of a network. It can be a fundamental layer underlying the logical data structures of the higher level functions in a network.

An example of a transceiver integrated circuit can be, but not limited to, the Semtech SX1276 LoRa transceiver integrated circuit.

A LoRa transceiver employs spread spectrum modulation based on chirp spread spectrum (CSS) technology similar to that used in some radar systems. It uses a wideband linear frequency modulated set of chirp pulses (i.e., sinusoidal signal whose frequency varies over time) that are used to encode information. This is a wideband radio system, and is more robust to noise and in-band interference than narrow band radio systems. CSS technology is also somewhat resistant to multi-path fading, Doppler effects and nearby interference. Unlike its modulation cousins, the DSSS (Direct-Sequence Spread Spectrum) and FHSS (Frequency Hopping Spread Spectrum), CSS doesn't employ pseudo-random sequences in the encoding process to distinguish the modulation effect from noise background and doesn't have orthogonal multi-channel capabilities such as with CDMA (Code Division Multiple Access). The Semtech chip SX1276 can provide receiver sensitivity as low as approximately −148 dBm albeit with reduced bit rates to compensate for the wider bandwidths and process gain. In addition, the LoRa transceiver can utilize built in CRC (Cyclic Redundancy Check) and variable error correction codes to achieve the increased receiver sensitivity.

In other embodiments and on occasions where higher data rates may be used, other modulation systems may be utilized such as FSK (Frequency-Shift Keying), OOK (On/Off Keying), GMSK (Gaussian Minimum-Shift Keying), MSK (Minimum-Shift Keying), or GFSK (Gaussian Frequency-Shift Keying). In still other embodiments, the irrigation systems 10, 30 can employ network topologies such as star or mesh to centralize control and provide extended ranges. In still other embodiments, the irrigation systems 10, 30 can utilize repeaters and gateways to further extend the range and connect to access points for a WIFI or Internet-based system.

In still other embodiments, the irrigation systems 10, 30 may use a FHSS (Frequency Hopping Spread Spectrum) modulation in addition to the LoRa-based CSS system to provide additional channel options for crowded spectrums. For yet another embodiment, to alleviate crowded radio spectrum issues and multiple in-band usage, a cognitive radio (CR) scheme may be employed to dynamically allocate wireless channels based on usage to avoid interference from nearby sources or noise. This CR scheme may also include adaptive transmission and reception adjustments to the transmitted power, bandwidth and bit rates to best allocate system resources in extremely crowded bandwidths.

Irrigation Controller

Figure 3:
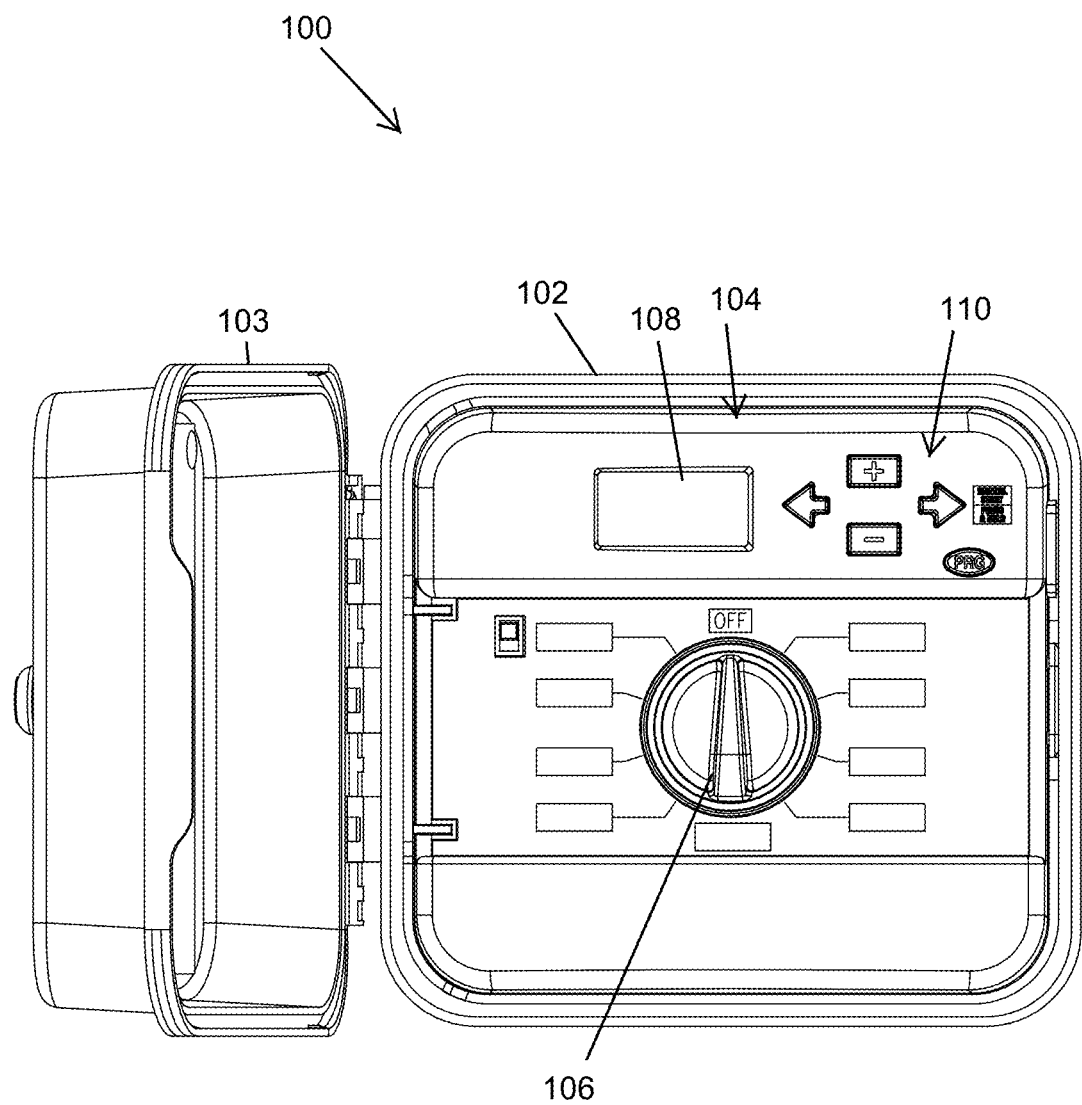
FIG. 3 is a front elevation view of an irrigation controller with its front door open to reveal its movable face pack in accordance with an embodiment.

FIG. 3 illustrates an example irrigation controller 100 that can be used in the irrigation systems 10, 30. FIG. 3 shows a front elevation view of the irrigation controller 100 with its front door open to reveal its movable face pack. The irrigation controller 100 can provide signals to turn individual valves on and off in accordance within an irrigation program. In some instances, the controller 100 can include a housing 102. In some embodiments, a door 103 can protect the inner portion of the irrigation controller 100 and can be opened to provide access for a user. A control panel 104 can comprise a microcontroller and appropriate circuitry to accomplish the control the irrigation of a landscaped area. In one embodiment, the control panel can include a selector switch 106 to access various functions and a display 108 to allow a user to view information regarding the selected function. In some embodiments, additional operator buttons 110 can allow a user to modify user definable functions of the irrigation program shown on the display 108. In certain embodiments, the control panel 104 may not have the buttons 110 and or a selector switch 106. In certain embodiments, the display 108 can be an interactive touch screen display.

Figure 4:
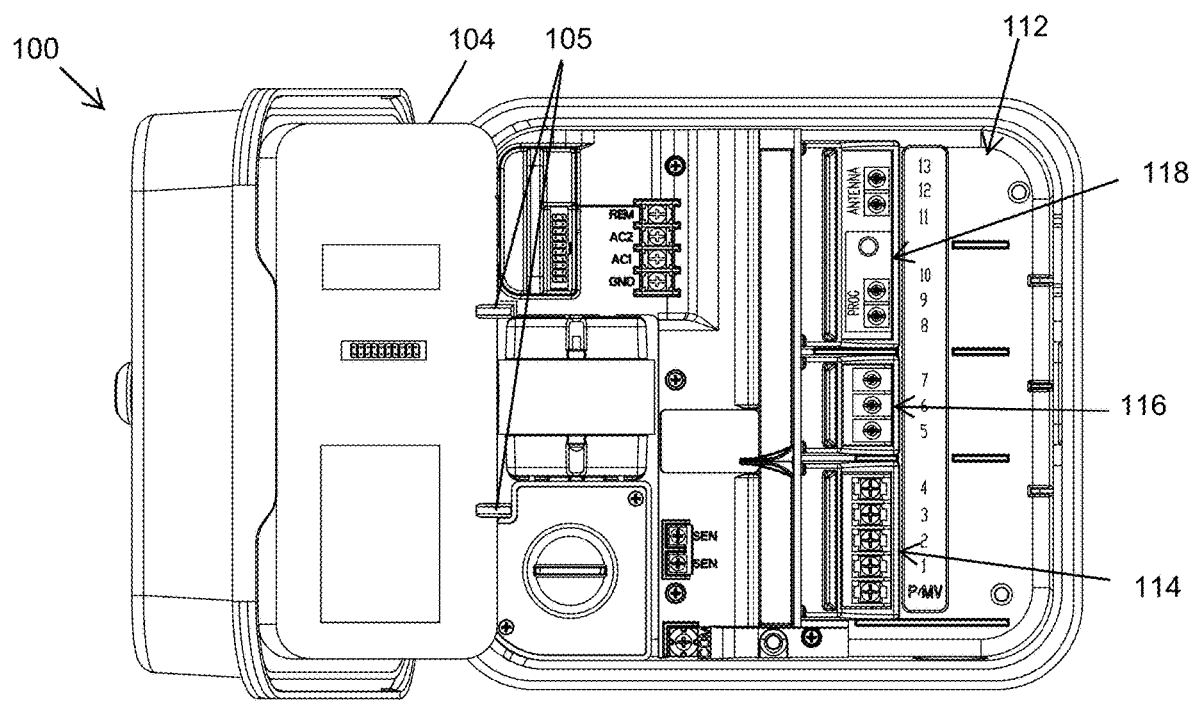
FIG. 4 is a front view of the irrigation controller of FIG. 3 with the face pack opened illustrating the wiring hook up area and a first style of a controller transceiver unit module installed in accordance with an embodiment.

The irrigation controller 100 can comprise a wiring hook up area and a control transceiver unit module. FIG. 4 illustrates a front view of the controller 100 of FIG. 3 with the face pack opened illustrating the wiring hook up area and an example of a first style of a controller transceiver unit module. In some embodiments, the irrigation controller 100 comprises a wiring hookup area 112 disposed behind the control panel 104. In an embodiment, the control panel 104 can be attached to the housing 102 by hinges 105 that allows the control panel 104 to swing open to provide access to the wiring hook up area 112. In some embodiments, the control panel 104 can be rigidly mounted to the housing 102 and the wiring hookup area can be located adjacent to the control panel 104.

In some embodiments, the irrigation controller 100 can be populated with removable output modules 114 and 116. In one embodiment, the output module 114 can comprise a pump/master valve output. In some embodiments, the output modules 114 and 116 can comprise one or more station output terminals. In some embodiments, an output module 114 can comprise both one or more pump/master valve outputs and one or more station output terminals.

Embedded Controller Transceiver Unit

In some embodiments, the irrigation controller 100 can be populated with a controller transceiver unit module 118 that takes the space of two or more output modules in two or more output module locations as illustrated in FIG. 4. The controller transceiver unit module 118 can make an electrical connection with the irrigation controller 100 when it is installed into the two or more module locations. The controller transceiver unit module can include an internal antenna or other preinstalled antenna or can include termination points configured to provide an attachment to an external antenna.

Figure 5:
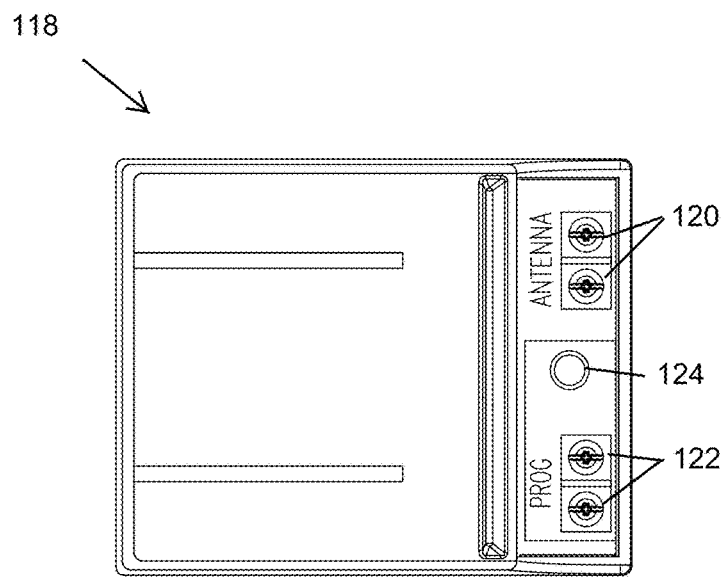
FIG. 5 is a front view of the controller transceiver unit module of FIG. 4 in accordance with an embodiment.

FIG. 5 illustrates an example controller transceiver unit module 118 including termination points 120 configured to provide an attachment for an external antenna. The antenna attachment points 120 can include screw terminals, as illustrated in FIG. 5, jacks, pig tail wires, or any other connection devices. Controller transceiver unit module 118 further includes programming connections 122. The programming connections 122 can be used to associate valve transceivers units 20, 44 to the controller transceiver unit module 118. The programming connections 122 can be include one or more of plug outlets, pig tail wires, spring clamps, or any other connecting devices to provide a connection point. In some embodiments, a button or switch 124 can be used to initiate an association between the controller transceiver unit module 118 and the valve transceiver unit 20, 44.

Figure 6:
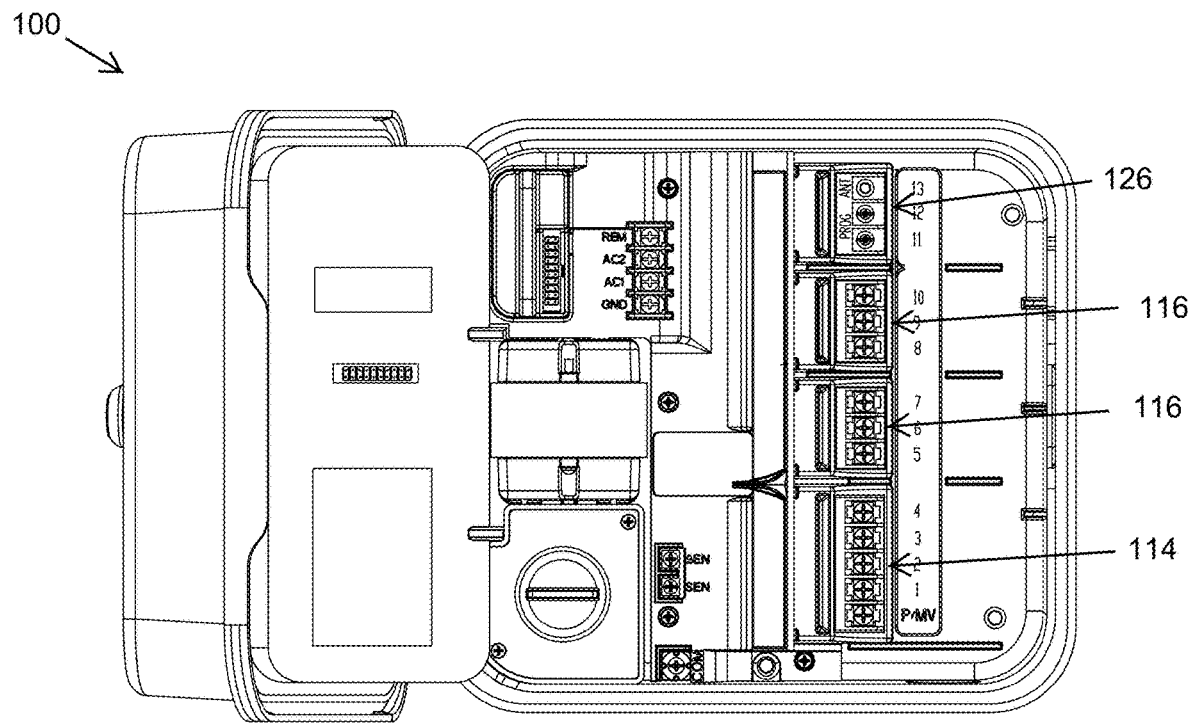
FIG. 6 is a front view of the controller of FIG. 3 with the face pack opened illustrating the wiring hook up area and a second style of a controller transceiver unit module installed in accordance with an embodiment.

FIG. 6 is a front view of the irrigation controller 100 with the face pack opened illustrating the wiring hook up area and an example of a second style of a controller transceiver unit module 126. In an aspect, the irrigation controller 100 can be populated with the controller transceiver unit module 126 that occupies a single output module location as illustrated in FIG. 6. The controller transceiver unit module 126 can makes an electrical connection with the irrigation controller 100 when it is installed into the output module location. The controller transceiver unit module 126 can contain an internal antenna or other preinstalled antenna, or can include one or more termination points to attach an external antenna.

Figure 7:
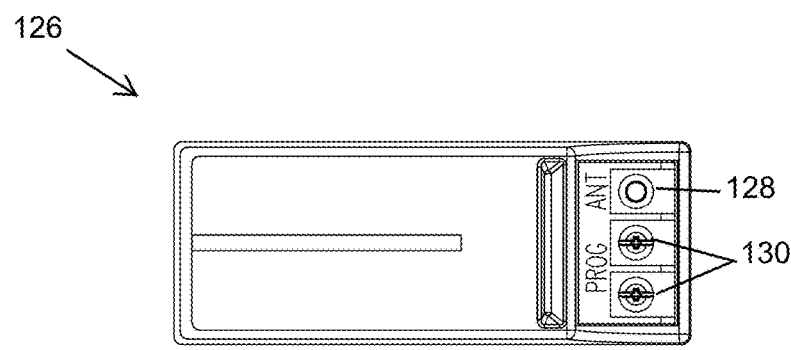
FIG. 7 is a front view of the controller transceiver unit module of FIG. 6 in accordance with an embodiment.

FIG. 7 illustrates an example controller transceiver unit module 126 including termination point 128 configured to provide an attachment for an external antenna. The termination point 128 can include a jack, such as a 3.5mm jack as illustrated in FIG. 7, one or more screw terminals, pig tail wires or any other connection devices. Controller transceiver unit module 126 further includes programming connection 130 used to associate the valve transceiver units 20, 44, to the controller transceiver unit module 126. The programming connection 130 can include a screw clamp terminal, as illustrated in FIG. 7, plug outlets, pig tail wires, spring clamps, or any other connecting devices to provide a connection point.

An irrigation controller can operate some irrigation control valves using conventional wiring and wirelessly communicate to valve transceiver units that then operate associated irrigation control valves. In some embodiments, the irrigation controller can operate all the irrigation control valves via wireless communications.

Figure 8:
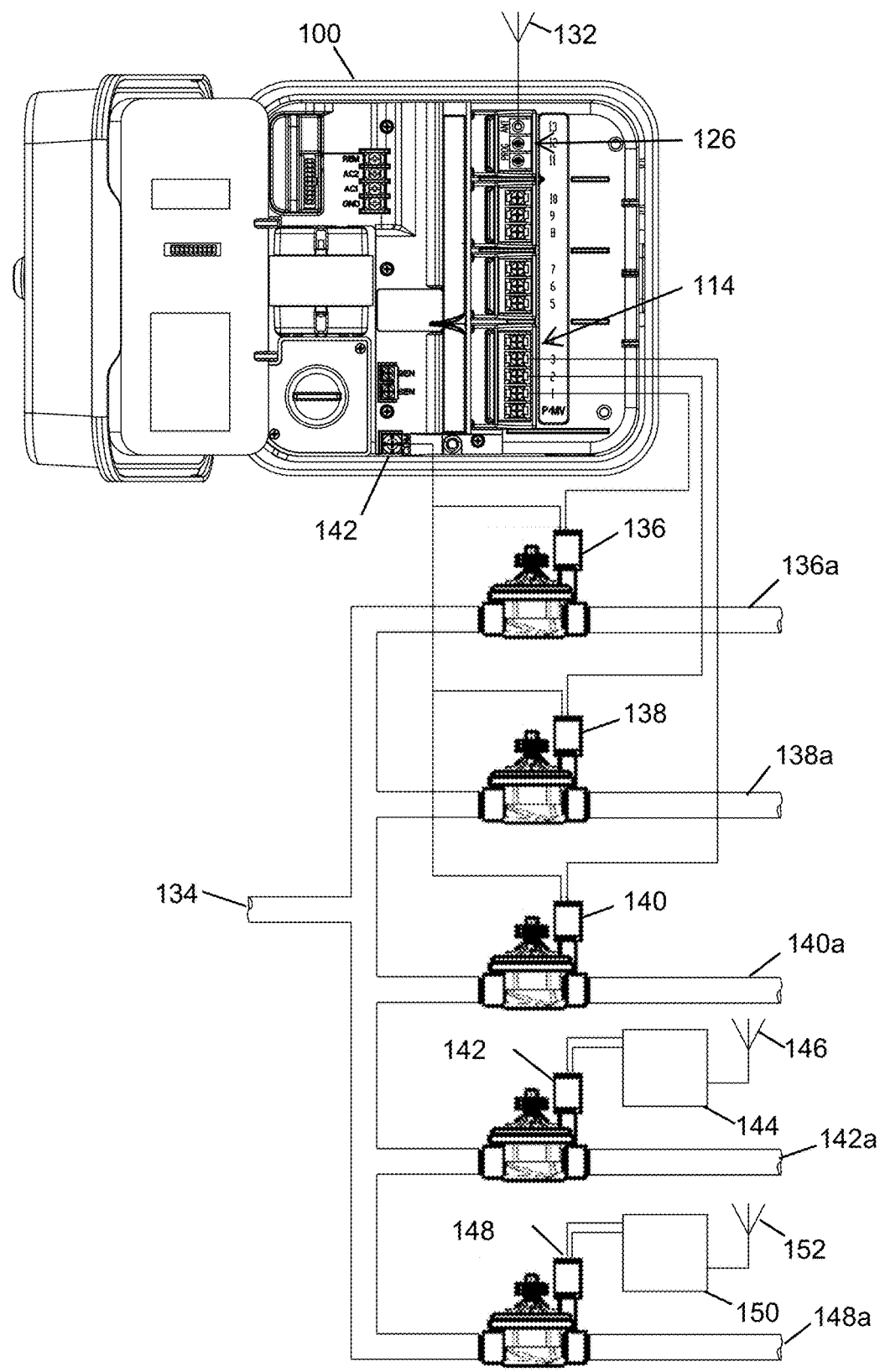
FIG. 8 is an illustration of an irrigation control system including wired and wireless irrigation control valves and the controller transceiver unit module of FIG. 7 in accordance with an embodiment.

FIG. 8 illustrates a representative irrigation system including the irrigation controller 100 having the controller transceiver unit module 126, and a plurality of wired and wireless irrigation control valves. In the illustrated irrigation system of FIG. 8, irrigation control valves 136, 138, 140 comprise wired irrigation control valves, a first wireless irrigation control valve includes valve transceiver unit 144 and irrigation control valve 142, and a second wireless irrigation control valve includes valve transceiver unit 150 and irrigation control valve 148.

Pressurized water can be supplied to an inlet pipe 134. In one arrangement the irrigation controller 100 controls the operation of the irrigation control valves 136, 138, and 140 with conventional station wiring, such that the irrigation control valves 136, 138, and 140 are in wired electrical communication with the irrigation controller 100. For example, irrigation control valve 136 can be wired to output 1 of the output module 114. Similarly, irrigation control valve 138 can be wired to output 2 and irrigation control valve 140 can be wired to output 3. Any of the irrigation control valves can be wired to any of the output terminals. A second wire from each of the irrigation control valves 136, 138, and 140 can be routed back to a common terminal 142. In operation, when the irrigation controller 100 energizes output 1, irrigation control valve 136 activates to cause water to flow through its associated pipe 136a to supply water to the irrigation components attached to pipe 136a. Such irrigation components can include sprinklers, drip irrigation devices, misters, or any other water distribution devices. When the irrigation controller 100 energizes output 2, irrigation control valve 138 operates in the same manner allowing water to flow through pipe 138a; and when the irrigation controller 100 energizes output 3, irrigation control valve 140 operates in the same manner allowing water to flow through pipe 140a.

In the illustrated irrigation system of FIG. 8, irrigation control valves 142 and 148 are not in wired electrical communication with an output of the irrigation controller 100. In some embodiments, a wireless controller transceiver unit module 118 or 126 can be installed into one or more output bays of the irrigation controller 100. FIG. 8 illustrates the controller transceiver unit module 126 inserted into a single output bay of the irrigation controller 100. The controller transceiver unit modules 126 and 118 can share similar, or the same operational capabilities. In some embodiments, an external antenna 132 is connected to the antenna jack 128.

Creating an Association

In some embodiments, the controller transceiver unit module 126 is preset to communicate to one or more valve transceiver units 144 and 150. In some embodiments, an assignment can be programmed to create an association between the controller transceiver unit module 126 and each of the valve transceiver units 144, 150. For example, one or more wires of the valve transceiver unit 144 can be connected to the programming connection 130 on the controller transceiver unit module 126. In some embodiments, these are the same wires that can later be used to connect the valve transceiver unit 144 to the irrigation control valve 142. In another embodiment, at least one different wire is provided on the valve transceiver unit 144 to create the association.

In one embodiment, a user can connect the valve transceiver unit 144 to the programming port 130. The user can then activate a desired station from the control panel of the irrigation controller 100 that coincides with a station that is normally accessible from the output bay in which the controller transceiver unit module 126 is installed. For example, in FIG. 8, the controller transceiver unit module 126 is inserted into the output bay that normally provides activations to stations 11, 12, and 13. In this example, the controller transceiver unit module 126 can create an association with the valve transceiver unit 144 to operate with any of stations 11, 12, and 13. When a user causes the irrigation controller 100 to activate the desired station and the valve transceiver unit 144 is connected to the programming connection 130, an association is created so that the valve transceiver unit 144 only energizes the irrigation control valve 142 when the irrigation controller 100 commands that station to operate. As an example, if the valve transceiver unit 144 is connected to the programming connection 130 when the user commands station 12 to run, then the association will be made such that the wireless commands concerning station 12 are only acted on by the valve transceiver unit 144 to control the irrigation control valve 142 in coordination with the commands from irrigation controller 100 to control station 12.

In some embodiments, a user can press the activation button 124, or other user input, to enable the association of the irrigation controller 100, the controller transceiver unit module 118, 126, and the solenoid valve transceiver unit 144. In some embodiments, the valve transceiver unit 144 can have a unique serial number, or other pre-assigned value. When the association is created between the controller transceiver unit module 126 and the valve transceiver unit 144, a value representing that serial number, or other identifier of the valve transceiver unit 144, is stored in a memory in the controller transceiver unit module 126. Additionally, the controller transceiver unit module 126 establishes a coordination between that value and the station that the irrigation controller 100 is operating. When a command is transmitted by the controller transceiver unit module 126, the command will include the value, or other code representing the value. Only valve transceiver unit 144 will respond to that code.

In some embodiments, the valve transceiver unit 144 can comprise a programmable memory. When the association is created between the controller transceiver unit module 126 and the valve transceiver unit 144, the controller transceiver unit module 126 assigns a value that is then stored in the memory of the valve transceiver unit 144. The controller transceiver unit module 126 establishes a coordination between that value and the station that the irrigation controller 100 is operating. When a command for that station is transmitted by the controller transceiver unit module 126, the command will include that value. Only the valve transceiver unit 144 will respond to that value and that value will only be transmitted relative to the command of the irrigation controller 100 in relation to the station that was in operation at the time the association was created.

In some embodiments, the commands to create the association are present at the programming connection 130 anytime a station is activated that is within the range of the stations normally operated within that output bay. In some embodiments, the controller transceiver unit module 126 can detect that a valve transceiver unit is connected to the programming connection 130 and the commands to create the association are present when a valve transceiver unit 144 is connected to the programming connection 130. Similarly, an association can be made between the controller transceiver unit module 126 and the valve transceiver unit 150 relative to a different station output command from the irrigation controller 100. In still other embodiments, wireless access to remote devices such as smart phones, smart watches, tablets or the like can be used to display information from the controller transceiver unit 126 to the user or to provide two-way communication between the controller transceiver unit 126 and the user.

Embedded Controller Transceiver Unit

Figure 9:
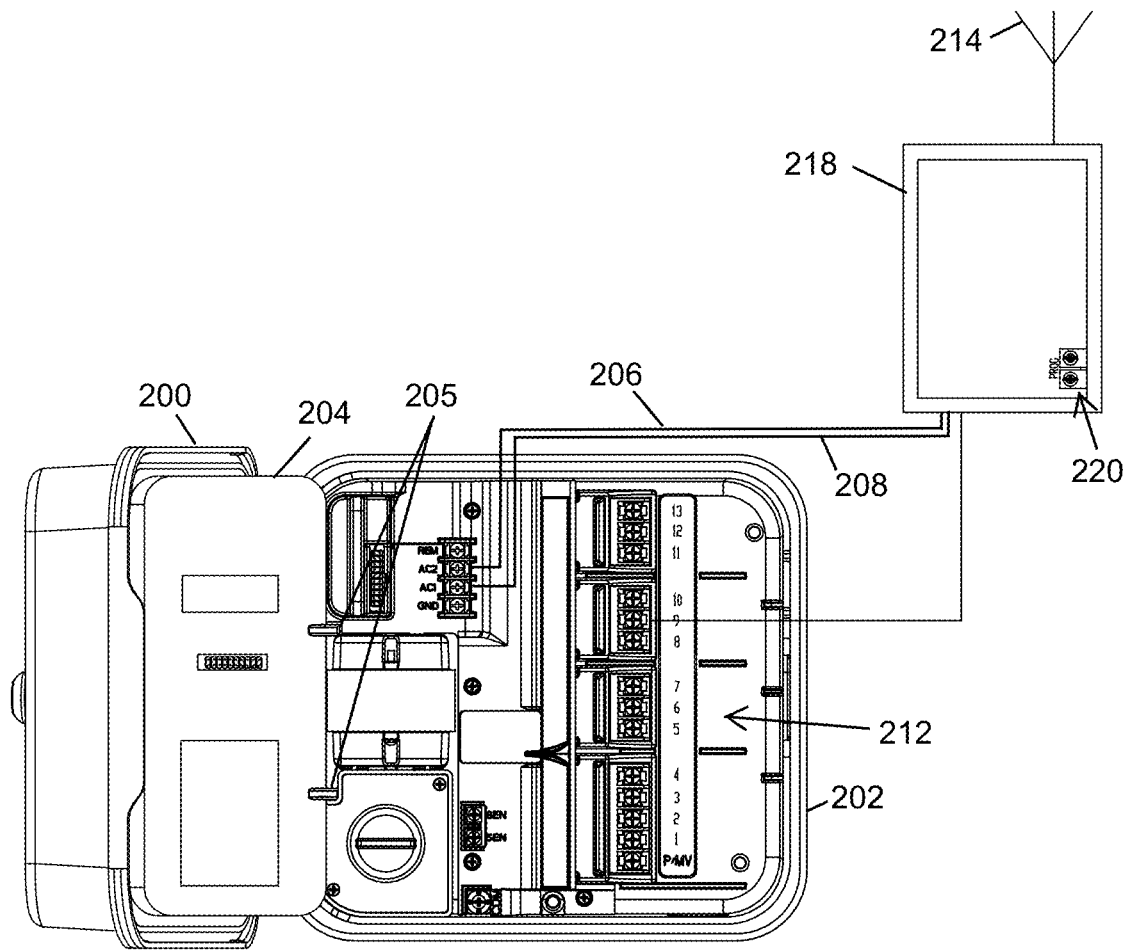
FIG. 9 is a front view of an irrigation controller with the face pack opened illustrating the wiring hook up area and a third style of a controller transceiver unit module electrically attached in accordance with an embodiment.

FIG. 9 is a front view of an irrigation controller 200 with the face pack opened illustrating the wiring hook up area and a third style of a controller transceiver unit module 218 in electrical communication in accordance with an embodiment. As illustrated in FIG. 9, the irrigation controller 200 can comprise a wiring hook up area disposed behind a control panel 204. In an embodiment, the control panel 204 can be attached to a housing 202 by hinges 205 that allows the control panel 204 to swing open to allow access to the wiring hook up area. In some embodiments, the control panel 204 can be rigidly mounted to the housing 202 and the wiring hookup area can be located adjacent to the control panel 204.

In some embodiments, the irrigation controller 200 can be populated with station output locations 212 in the wiring hookup area. In the illustrated irrigation controller 200, the wiring hookup area includes output station locations numbered from 1 to 13. In some embodiments, the station output locations 212 can be populated with removable output station modules that can be associated with any number of master valve/pump relay connections and irrigation control valves. In some embodiments, the controller 200 can be provided with a fixed number of station output locations 212.

In some embodiments, a controller transceiver unit module 218 can be attached to one station output location 212 of the irrigation controller 200. The controller transceiver unit module 218 can contain an internal antenna or other preinstalled antenna. In some embodiments, the controller transceiver unit module 218 can use an external antenna 214. The antenna 214 can attach to one or more jacks, pig tail wires or any other connection devices provided with the controller transceiver unit module 218.

The controller transceiver unit module 218 includes programming connections 220 to associate valve transceiver units to the controller transceiver unit module 218. In some embodiments, the programming connections can be one or more terminals, as illustrated in FIG. 9, plug outlets, pig tail wires or any other connection devices. In an embodiment, the controller transceiver unit module 218 can include a button, or other user input device to initiate an association between the controller transceiver unit module 218 and a valve transceiver unit.

Figure 10:
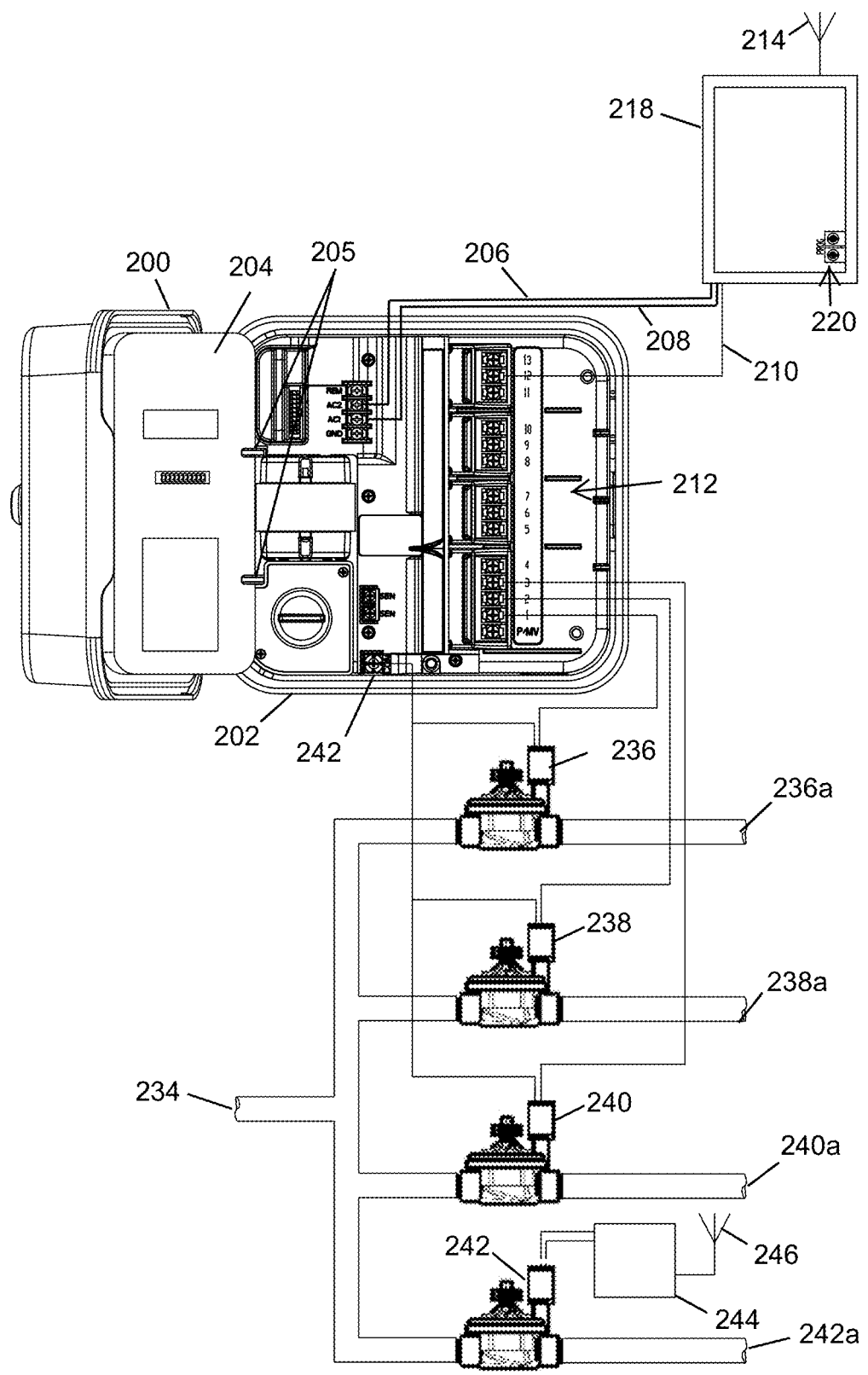
FIG. 10 is an illustration of an irrigation control system including wired and wireless irrigation control valves and the controller transceiver unit module of FIG. 9 in accordance with an embodiment.

FIG. 10 illustrates a representative irrigation system comprising the irrigation controller 200, the controller transceiver unit module 218, a plurality of wired irrigation control valves 236, 238, 240, and a wireless irrigation control valve that includes a valve transceiver unit 244 and an irrigation control valve 242.

Pressurized water can be supplied to an inlet pipe 234. In one arrangement the irrigation controller 200 controls the operation of the irrigation control valves 236, 238, and 240 with conventional station wiring. For example, irrigation control valve 236 can be in wired electrical communication with station output 1 of irrigation controller 200. Similarly, irrigation control valve 238 can be in wired electrical communication with station output 2 and irrigation control valve 240 can be in wired electrical communication with station output 3. Any of the valves can be wired to any of the output terminals. A second wire from each of the irrigation control valves 236, 238, and 240 can be routed back to a common terminal 242. In operation, when the irrigation controller 200 energizes station output 1, the irrigation control valve 236 is activated to cause water to flow through its associated pipe 236a to feed the irrigation components attached to pipe 236a. Such irrigation components can include sprinklers, drip irrigation devices, misters, or any other water distribution devices. When the irrigation controller 200 energizes station output 2, irrigation control valve 238 operates in the same manner allowing water to flow through pipe 238a and when the irrigation controller 200 energizes station output 3, irrigation control valve 240 operates in the same manner allowing water to flow through pipe 240a.

In the illustrated irrigation system of FIG. 10, the irrigation control valve 242 is not wired directly to a station output of the irrigation controller 200 but is controlled via wireless communications. In some embodiments, a controller transceiver unit module 218 can be connected to the irrigation controller 200. The controller transceiver unit module 218 can be electrically connected to the irrigation controller 200 via a wire harness that includes at least wires 206, 208 and 210. Additional wires such as a ground wire can be included. Wire 210 can be connected to one of the station outputs of the irrigation controller 200. For illustrative purposes, the wire 210 is illustrated connecting to station output 12. The wire 210 can be connected to any of the station outputs that the user desires.

In some embodiments an antenna is integrally mounted to the controller transceiver unit 218. In some embodiments, an external antenna 214 is connected to the controller transceiver unit module 218.

In some embodiments, the controller transceiver unit module 218 is preset to communicate with the valve transceiver unit 244. In some embodiments, an assignment can be programmed to create an association between the controller transceiver unit module 218 and the valve transceiver unit 244. In one embodiment, one or more wires of the valve transceiver unit 244 can be connected to the programming connection 220 on the controller transceiver unit module 218. In some embodiments, these are the same wires that can be connected to the irrigation control valve 242. In another embodiment, at least one different wire is provided on the valve transceiver unit 244 to create the association.

In one embodiment, a user can connect the valve transceiver unit 244 to the programming connection 220. The user can then activate a desired station from the control panel that coincides with the station output that wire 210 is connected to. For example, in FIG. 10, the controller transceiver unit module 218 is in wired electrical communication with station output 12. In this example, the controller transceiver unit module 218 can create an association with the valve transceiver unit 244 to operate with station 12. When the irrigation controller 200 energizes that desired station and the valve transceiver unit 244 is connected to the programming connection 220, an association is created so that the valve transceiver unit 244 only energizes the irrigation control valve 242 when the controller 200 commands that station to operate.

For example, if the solenoid valve transceiver unit 244 is connected to the programming connection 220 when the user commands station 12 to run, then the association will be made such that the wireless commands concerning station 12 are only acted on by valve transceiver unit 244 to control the irrigation control valve 242 in coordination with the controller's 200 commands to control station 12. The association is between the controller transceiver unit module 218 and the valve transceiver unit 244. Thus, once the association is created, the irrigation control valve 242 is activated when station 12 energizes. If a user later moves the wire 210 to a different station output 212, then the irrigation control valve 242 will activate in accordance with the output of the new output station locations.

In some embodiments, the valve transceiver unit 244 can have a unique serial number, or other pre-assigned value. When the association is created between the controller transceiver unit module 218 and the valve transceiver unit 244, a value representing that serial number, or other identifier of the valve transceiver unit 244, is stored in a memory in the controller transceiver unit module 218. When controller transceiver unit module 218 transmits a command, the command will include the value, or other code representing the value. Only the valve transceiver unit 244 will respond to that code.

In some embodiments, the valve transceiver unit 244 can comprise a programmable memory. When the association is created between the controller transceiver unit module 218 and the valve transceiver unit 244, the controller transceiver unit module 218 assigns a value that is then stored in the memory of the valve transceiver unit 244. The controller transceiver unit module 218 establishes a coordination between that value and the wire 210 that is connected to the station output that the irrigation controller 200 is operating. When a command for that station is transmitted by the controller transceiver unit module 218, the command will include the value. Only the valve transceiver unit 244 will respond to that value.

In some embodiments, the commands to create the association are present at the programming connection 220 anytime the station is activated that is connected to wire 210. In some embodiments, the controller transceiver unit module 218 can detect that a valve transceiver unit is connected to the programming connection 220 and the commands to create the association are present when the valve transceiver unit 244 is connected to the programming connection 220.

In some embodiments, the controller transceiver unit module 218 can include at least one user input device, such as a button, or other switch that the user can interact with during a solenoid valve transceiver unit association process. In some embodiments, the association between the controller transceiver unit 218 and the valve transceiver unit 244 is created when the valve transceiver unit 244 is connected to the programming connection 220 and a button, switch, or other user input device is activated. In this scenario, a station does not need to be energized by the irrigation controller 200 to accomplish the association. In some embodiments, the controller transceiver unit module 218 can include at least one display, such as an LCD, LED, or other feedback device that the user can interact with during a valve transceiver unit association process. In still other embodiments, there is no enclosed display with the controller transceiver unit module 218, but wireless access to remote devices such as smart phones, smart watches, tablets or the like can be used to display information to the user or to provide two-way communication between the controller transceiver unit 218 and the user.

Figure 11:
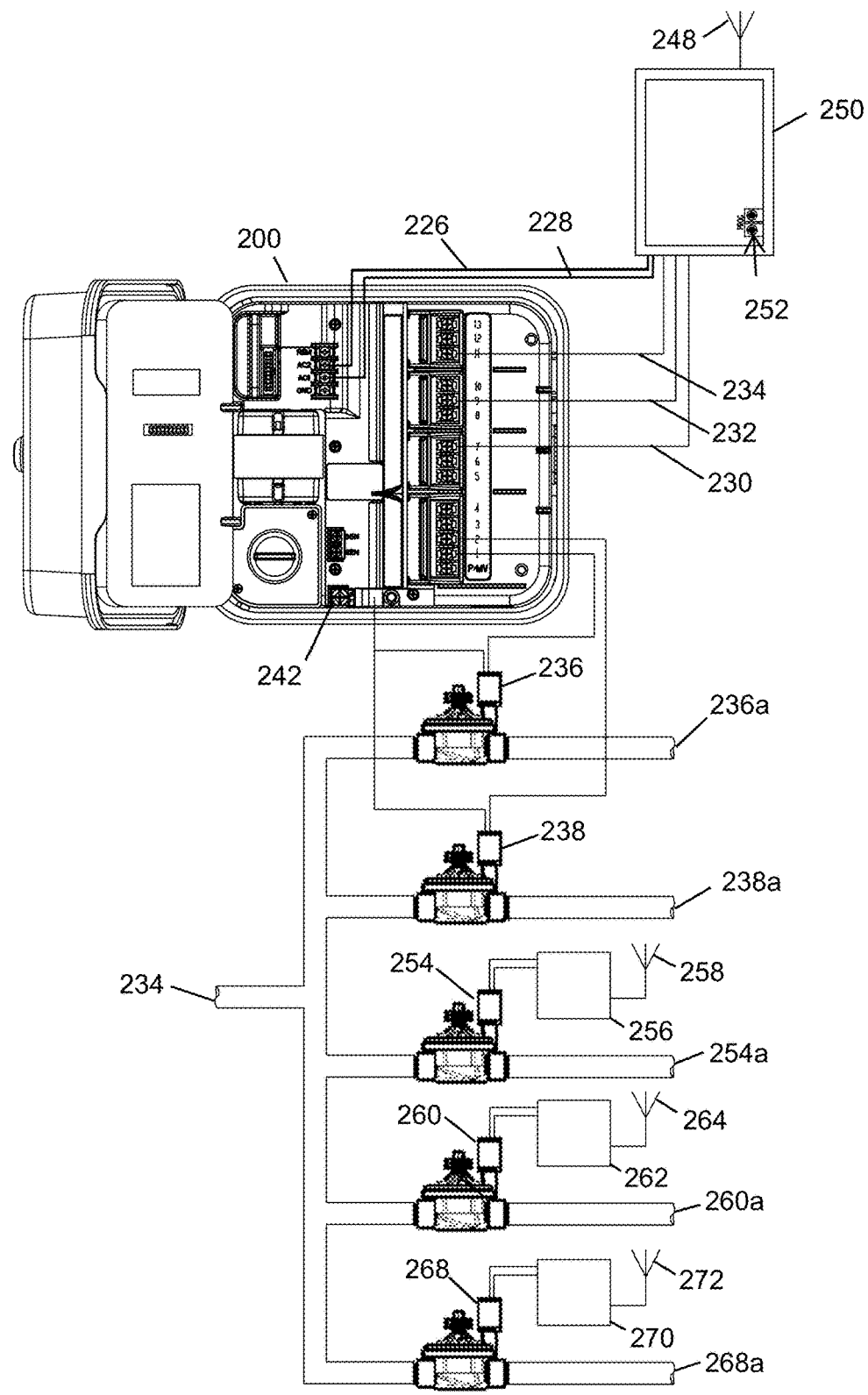
FIG. 11 is an illustration of an irrigation control system including wired and wireless irrigation control valves and a fourth style controller transceiver unit module electrically attached in accordance with an embodiment.

FIG. 11 illustrates an example irrigation control system including irrigation controller 200, a controller transceiver unit module 250 having one or more wires 230, 232, 234 in electrical communication with the controller transceiver unit module 250, a plurality of wired irrigation control valves 236, 238, a first wireless irrigation control valves including valve transceiver unit 256 and irrigation control valve 254, a second wireless irrigation control valves including valve transceiver unit 262 and irrigation control valve 260, and a third wireless irrigation control valves including valve transceiver unit 270 and irrigation control valve 268 in accordance with an embodiment.

Creating an Association

In some embodiments, an assignment can be programmed to create an association between the controller transceiver unit module 250 and individually to each of the valve transceivers 256, 262 and 270. In one embodiment, one or more wires of the valve transceiver unit 256 can be connected to the programming ports 252 on the controller transceiver unit module 250. In some embodiments, these are the same wires that will later connect to the irrigation control valve 254. In another embodiment, at least one different wire is provided on the valve transceiver unit to create the association.

In one embodiment, a user can connect the valve transceiver unit 256 to the programming port 252. The user can then activate a desired station from the control panel of the irrigation controller 200 that coincides with a station that the user wants associated with the valve transceiver unit 256. In this example, three wires 230, 232, and 234 of the controller transceiver unit module 250 can be connected to station outputs 7, 9, and 11. Any number of available wires from the controller transceiver unit module 250 can be attached to any station outputs on the irrigation controller 200 that the user desires. When the irrigation controller 200 activates that desired station and the valve transceiver unit 256 is connected to the programming port 252, an association is created so that the valve transceiver unit 256 energizes the irrigation control valve 254 when the irrigation controller 200 commands that station to operate.

For example, if the valve transceiver unit 256 is connected to the programming ports 252 when the user commands station 7 to run, then the association will be made such that the wireless commands concerning station 7 are only acted on by valve transceiver unit 256 to control the irrigation control valve 254 in coordination with the irrigation controller's 200 commands to control station 7. In some embodiments, the valve transceiver unit 256 can have a unique serial number, or other pre-assigned value. When the association is created between the controller transceiver unit module 250 and the valve transceiver unit 256, a value representing that serial number, or other identifier of the valve transceiver unit 256, is stored in a memory in the controller transceiver unit module 250. Additionally, the controller transceiver unit module 250 establishes a coordination between that value and the wire that is connected to the station that the irrigation controller 200 is operating. In this example, that can be wire 230 that is connected to station 7. When a command is transmitted by the controller transceiver unit module 250, the command will include the value, or other code representing the value. Only the valve transceiver unit 256 will respond to that code.

In some embodiments, the valve transceiver unit 256 can comprise a programmable memory. When the association is created between the controller transceiver unit module 250 and the valve transceiver unit 256, the controller transceiver unit module 250 assigns a value that is then stored in the memory of the valve transceiver unit 256. The controller transceiver unit module 250 also establishes an association between that value and the wire 230 that is connected to the station that the irrigation controller 200 is operating. When a command for that station is transmitted by the controller transceiver unit module 250, the command will include the value. Only the valve transceiver unit 256 will respond to that value and that value will only be transmitted relative to the command of the irrigation controller 200 in relation to the wire 230 that was energized at the time the association was created.

In some embodiments, the commands to create the association are present at the programming ports 252 anytime a station is activated that is in electrical communication or wired to the controller transceiver unit module 250. In some embodiments, the controller transceiver unit module 250 can detect that a valve transceiver unit is connected to the programming ports 252 and the commands to create the association are only present when a valve transceiver unit is connected to the programming ports 252. The commands can be communicated via the electrical connection between the controller transceiver unit module 250 and the valve transceiver unit 256 when the valve transceiver unit 256 is electrically connected to the programming ports 252. In an embodiment, this communication path is a unidirectional communication path. In another embodiment, this communication path is a bidirectional communication path.

Similarly, an association can be made between the controller transceiver unit module 250 and the valve transceiver unit 262 relative to a different wire, such as wire 232 that can be connected to-a station output of the irrigation controller 200. In this example, wire 232 can be wired to station 9. Wire 232 can be connected to any station output terminal that the user desires. Similarly, an association can be made between the controller transceiver unit module 250 and the valve transceiver unit 270 relative to a different wire, such as wire 234 that can be connected to a station output of the irrigation controller 200. In this example, wire 234 can be wired to station 11. Wire 234 can be connected to any station output terminal that the user desires.

In some embodiments, the controller transceiver unit module 250 can include at least one user input device, such as a button, or other switch that the user can interact with during a valve transceiver unit association process. In some embodiments, the controller transceiver unit module 250 can include at least one display, such as an LCD, LED, or other feedback device that the user can interact with during a valve transceiver unit association process.

In still other embodiments, there is no enclosed display with the controller transceiver unit module 250, but wireless access to remote devices such as smart phones, smart watches, tablets or the like that can be used to display information to the user or to create a two-way communication between the remote device and the controller transceiver 250. This can be accomplished wirelessly through Bluetooth, Zigbee®, WIFI or other wireless means. It can also be accomplished through non-RF transport mediums such as infrared communications.

When an association is created, that association comprises an association between a wire, such as one of wires 230, 232, or 234 and one of a group of valve transceivers 256, 262, and 270. The association between the irrigation controller 200 and the controller transceiver unit 250 is through the wires 230, 232, or 234. If a user moves one the wires 230, 232, or 234 to a different station output 212, then the valve transceiver unit associated with that wire will be controlled by the new station output location.

Wirelessly Creating an Association

In some embodiments, the association between any of the earlier described embodiments of a controller transceiver and a valve transceiver can be made wireles sly and thus does not require any physical connection to each other. In one embodiment a user can energize a valve transceiver. In an embodiment, the valve transceiver can be energized by installing a battery. In some embodiments, a valve transceiver can comprise a power switch that a user can move to an ON position to energize the valve transceiver. In either case, when the valve transceiver is energized, it will listen for a predetermined programming time period to sense a station ON command from the controller transceiver. The predetermined programming time can be fifteen seconds. The predetermined programming time can be more than fifteen seconds. The predetermined programming time can be less than fifteen seconds. During this predetermined programming time, a user can manually turn ON a station on the irrigation controller that is connected to the controller transceiver. When this station is energized, the controller transceiver will send a station ON command. When the valve transceiver senses the station ON command, it will store a station identifying code embedded in the transmission and will create the association for that station code with the controller transceiver. Once this association is made, the valve transceiver will only respond to communication from the controller transceiver that contains that station identifying code.

In some embodiments, the valve transceiver is already energized and a button, or other user interface can be provided on the valve transceiver to start the association process. In such an embodiment, a user can press the button, or otherwise manipulate the user interface to begin the association in the same way as energizing the valve transceiver as described above.

As an example, in FIG. 11 the controller transceiver unit 250 and valve transceiver unit 256 can create an association wirelessly. A user can energize the valve transceiver unit 256 or activate a user interface on the irrigation control valve 256 if so equipped. A user may enter a manual start command for station 7 on the operator interface of the irrigation controller 200. This causes the irrigation controller 200 to energize station 7 which is connected to the controller transceiver unit module 250 via wire 230. The controller transceiver unit module 250 can transmit a station ON command. The station ON command can include a station identifying code. If this is accomplished within the programming time frame, the valve transceiver unit 256 can store the station identifying code in its memory. In some embodiments, the valve transceiver unit 256 will activate the irrigation control valve 254 to open and allow water to flow through the irrigation components connected to pipe 254a. This can confirm to the user that the association between the controller transceiver unit module 250 and the valve transceiver 258 has been made. In an aspect, the valve transceiver unit 256 will only respond to commands from the controller transceiver unit module 250 that include that station identifying code. In some embodiments, a user can reassign the association of valve transceiver unit 256 by repeating the assignment procedure. In some embodiments, a user can create an association wirelessly between the controller transceiver 250 and the valve transceiver units 262 and 270 by repeating the assignment procedure with each of the valve transceiver units and energizing the appropriate station outputs in the irrigation controller.

Figure 12:
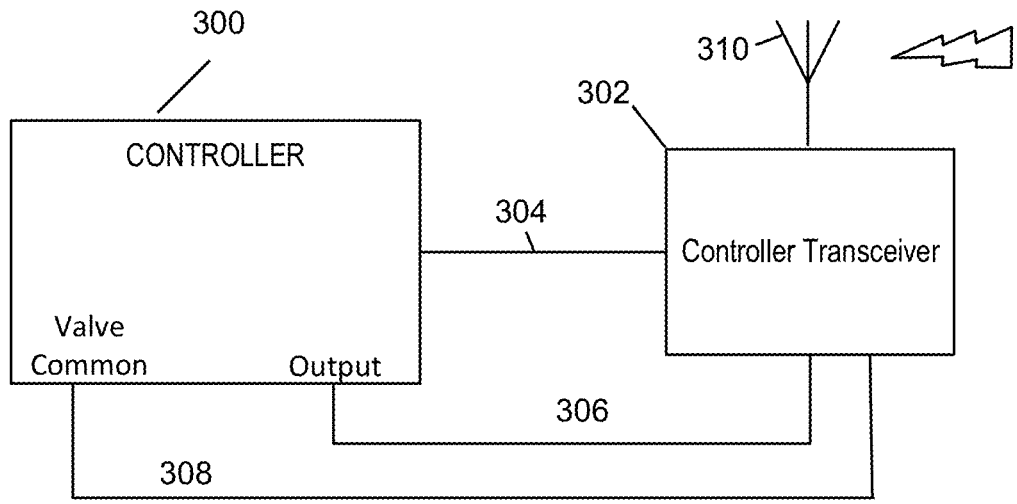
FIG. 12 is block diagram illustrating the irrigation controller and the controller transceiver unit in accordance with an embodiment.
Figure 13:
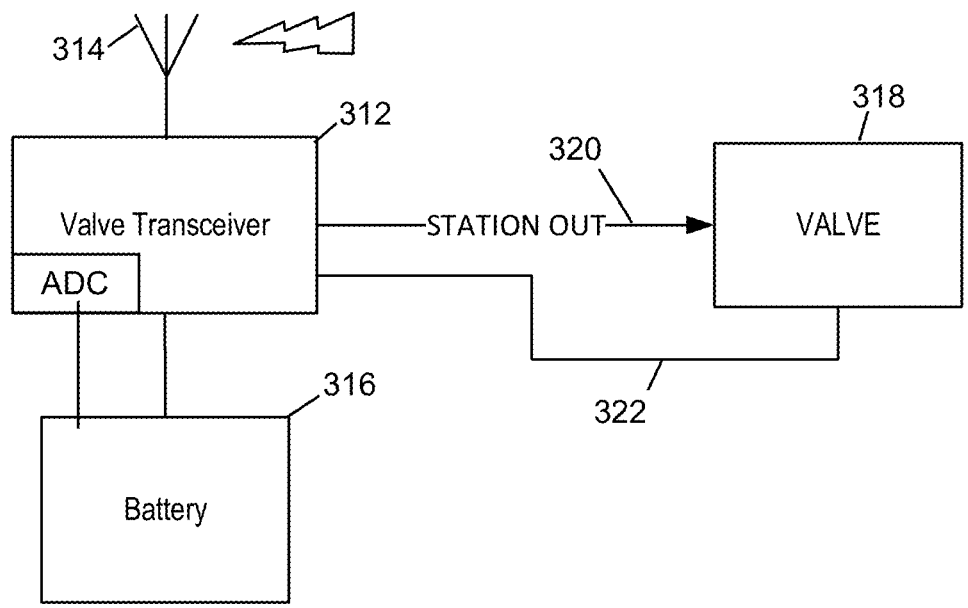
FIG. 13 is a block diagram illustrating the valve transceiver unit and the irrigation control valve in accordance with an embodiment.

FIG. 12 is block diagram illustrating an example irrigation controller 300 and controller transceiver unit module 302. FIG. 13 is a block diagram illustrating an example valve transceiver unit 312 and irrigation control valve 318.

Referring to FIGS. 12 and 13, the irrigation controller 300 provides power to the controller transceiver unit 302 via a wired cable 304. A station output 306 provides an output signal for valve open and closure. A valve common 308 provides a return path for the signals and power. An antenna 310 provides a wireless signal to communicate to the valve transceiver unit 312 via an antenna 314. A battery 316 provides power to the valve transceiver unit 312. The valve transceiver unit 312 upon receipt of valve open or close signals from the controller transceiver unit module 302, opens or closes the irrigation control valve 318, accordingly, through a station signal 320. A valve common 322 provides a signal return path for the irrigation control valve 318.

FIG. 13 also illustrates a connection from the battery 316 to a microcontroller analog-to-digital converter (ADC) embedded within the valve transceiver unit 312. The microcontroller ADC senses the voltage level of the battery 316 and determines the state and charge of the battery 316. Microcontroller ADC can be, but is not limited to Microchip PIC18F86K90. Microcontroller ADC can use a built-in analog to digital converter (ADC) to sense the battery voltage level. In other embodiments, this function can be implemented by a standalone ADC separate from the microcontroller, by a using a switched capacitor that measures the charging time of a known capacitor value to a predetermined voltage level, and the like. For example, the voltage thresholds for a 9-volt alkaline battery are: above about 8 volts denotes a full battery, about 8 volts to about 6 volts determines a mid-range discharge level, and below about 6 volts denotes a low battery that should be replaced to continue functioning. In an aspect, once the battery 316 has a low battery state, the valve side circuitry of the valve transceiver unit 312 turns off any irrigation control valves 318 that may be on. In an aspect, if the state of the battery 316 is too low to charge the circuit to turn off the irrigation control valve 318, a backup capacitor can used to deactivate the irrigation control valve 318 to an off state. During this low battery state, it may not be possible to activate the irrigation control valve 318 until the battery 316 is replaced.

Valve Transceiver Power Management

Figure 14:
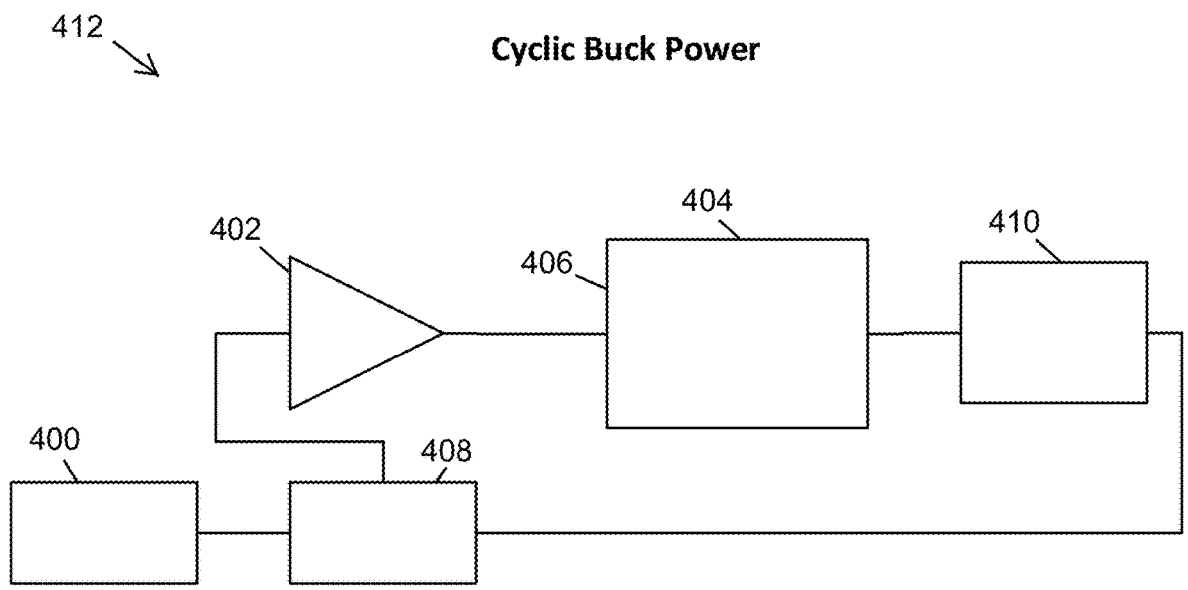
FIG. 14 is a block diagram illustrating the cyclic buck power system that manages the battery power in the wireless irrigation control valve in accordance with an embodiment.

To avoid frequent battery replacement, it is important to effectively manage current consumption. Power planning and limited use of on-air radio time can provide years of effective battery life while still delivering timely irrigation events FIG. 14 is a block diagram illustrating an example cyclic buck power system 412 that manages the battery power of a battery 400 in the wireless valve transceiver unit 312 in accordance with an embodiment. The battery 400 provides the valve transceiver unit 312 with an independent source of power. A low power comparator 402 with hysteresis can be implemented in one embodiment by utilizing a TLV3701 comparator by Texas Instruments. In other embodiments, other comparator devices can be used. A buck converter 404 can efficiently drop the variable voltage the battery sources to a level that is compatible with most microcontrollers and electronic circuitry. In one embodiment, the buck converter 404 can use a Microchip MIC5206. In other embodiments, other comparable devices can be used. The comparator 402 provides an enable function 406 to the buck converter 404. The buck converter 404 is periodically enabled by the comparator 402 when the system voltage 408 drops below about a 2.6 volt threshold, in this example. A capacitor and blocking diode 410 are components used to smooth and filter the system voltage output.

Figure 15:
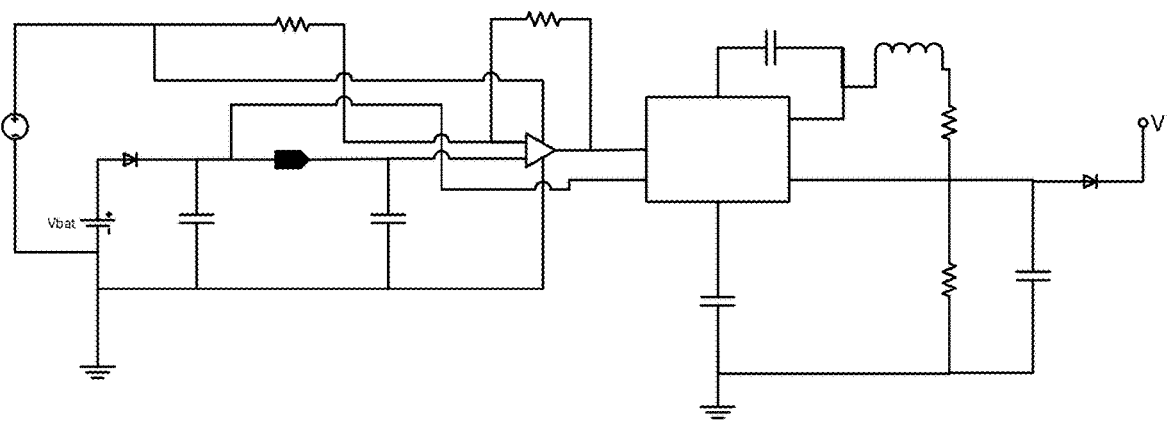
FIG. 15 is a schematic diagram illustrating the electronic components of the cyclic buck power system that manages the battery power in the wireless irrigation control valve in accordance with an embodiment.

FIG. 15 is a schematic diagram illustrating an example of the electronic components of the cyclic buck power system 412 that manages the battery power in the valve transceiver unit 312 in accordance with an embodiment.

Bidirectional Communication System

In some aspects, a bidirectional communication system implements the wireless functionality. Referring to FIG. 1, the controller transceiver unit 16 can initiate communication as well as receive communication asynchronously from the valve transceiver unit 20. The controller transceiver unit 16 can primarily be listening in receiver mode whenever it is not actively transmitting. However, the valve transceiver unit 20 is primarily in sleep mode to conserve battery power and synchronously checks for wireless signal updates from the controller transceiver unit 16. For example, the valve transceiver unit 20 can check for wireless signal updates about every 6 seconds, every 10 seconds, every 0.50 seconds, every 20 seconds, and the like.

FIGS. 17-23 illustrate examples of message formats for the communications between the controller transceiver unit 16 and the valve transceiver unit 20.

Figures 17, 18, 19, 20, 21:
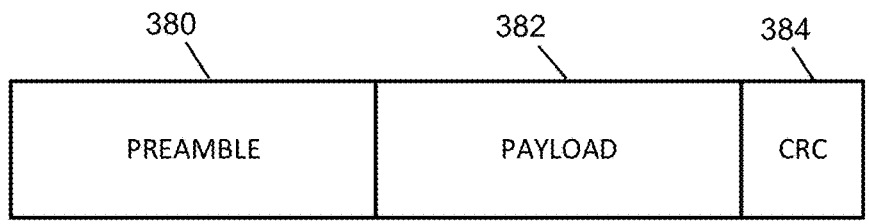
FIG. 17 illustrates the general message format for the wireless communication in accordance with an embodiment.
FIG. 18 illustrates the message format for the wireless communication in accordance with an embodiment.
FIG. 19 illustrates the signal strength message format for the wireless communication in accordance with an embodiment.
FIG. 20 illustrates the controller ACK message format for the wireless communication in accordance with an embodiment.
FIG. 21 illustrates the controller NACK message format for the wireless communication in accordance with an embodiment.

FIG. 17 illustrates an example of a general message format for the wireless communication. In the illustrated example of FIG. 17, the message format comprises a preamble 380, a payload 382, and a cyclic redundancy check (CRC) 384. In general, the message begins with the preamble 380, which is used to synchronize the receiver with the incoming data flow. In an embodiment, the preamble 380 is a 12-symbol long sequence, but the sequence be shortened to accommodate a quicker signal burst. In other embodiments, the preamble 380 may be greater than a 12-symbol sequence. The CRC 384 is a Cyclic Redundancy Check used as an error correcting code to ensure the integrity of the data. In an embodiment the CRC 384 utilizes 16 bits of the message. In other embodiments, the CRC 384 may be shorter than 16 bits or may be greater than 16 bits. The payload 382 is a variable length field that contains the actual data or message being conveyed. FIGS. 18-23 illustrate examples of payloads 382 used to communicate data or acknowledge the valve state.

FIG. 18 illustrates an example of an acknowledge (ACK) message sent by the valve transceiver unit 20 to the controller transceiver 16 in response to a request for an acknowledgement from the controller transceiver unit 16. In the example valve transceiver ACK message, the payload 382 comprises 8 bits. The example ACK message provides a battery state in bits 7 and 6, a valve status in bit 4, and the address in bits 0, 1 and 2. Bits 4 and 5 are unused in this example. The battery state can be a 3-level representation of the battery, where 0 represents a low or nearly discharged battery state, 1 represents an approximately half discharged battery state, and 2 represents a fully charged battery state. The valve status indicates whether the irrigation control valve 22 controlled by the valve transceiver unit 20 is ON or OFF. An ON state is represented by a 1, and an OFF state is represented by a zero. The address can be used for messaging purposes and can be optional in many embodiments.

FIG. 19 illustrates an example of a signal strength message sent by the valve transceiver unit 20 to the controller transceiver 16. In the example valve transceiver signal strength message, the payload 382 comprises 8 bits. The signal strength message comprises the received signal strength indicator (RSSI), and the transmitted signal strength indicator (TX STR). In example signal strength message, the RSSI is a level indicator that has 16 indicated levels at bits 4-7. The transmit strength is a level indicator with 16 levels at bits 0-3. The transmit strength indicator can be used to adjust up or down the amount of power used in the transmissions to accommodate noisy channels. The maximum and minimum levels used are adjustable within the allowable limits set by the governing body of the wireless spectrum in the region that the product is used.

FIGS. 20 and 21 illustrate examples of messages that are sent by the controller transceiver unit 16 to the valve transceiver unit 20 in response to the controller transceiver unit 16 receiving the ACK message from the valve transceiver unit 20. In the example controller transceiver ACK/NACK messages, the payload 382 comprises 8 bits. As described above, the ACK message (FIG. 18) from the valve transceiver unit 20 includes the state of the irrigation control valve 22. When the state of the irrigation control valve 22 is correct, the controller transceiver unit 16 sends an ACK message, as illustrated in FIG. 20. When the state of the irrigation control valve 22 is incorrect, the controller transceiver unit 16 sends a non-ACK (NACK) message, as illustrated in FIG. 21.

In contrast to the valve transceiver unit ACK message (FIG. 18), the ACK (FIG. 20) and NACK (FIG. 21) messages from the controller transceiver unit 16 confirm the state or reject the state of the irrigation control valve 22 as relayed by the valve transceiver unit ACK message. Referring to FIGS. 20 and 21, the controller transceiver ACK message is different from the controller transceiver NACK message and can be easily distinguished by the bit stream pattern. For example, the controller transceiver ACK message comprises the ACK in bits 4-7 while the controller transceiver NACK message comprises the NACK in bits 0-3.

FIG. 22 illustrates an example of an activate ON message sent by the controller transceiver unit 16 to the valve transceiver unit 20 to activate the irrigation control valve 22 such that the irrigation control valve 22 permits the flow of water through the valve body. In the example controller transceiver activate message, the payload 382 comprises 8 bits. The example activate ON message provides a bit to activate the valve in bit 7, power level used indication (ST7 and ST6) in bits 6 and 5, and oscillator drift and offset errors indication (RF5-RF1) used to tune the oscillator in bits 4-0. Bit 7 can be a logic level 1 to activate the irrigation control valve 22.

FIG. 23 illustrates an example of an activate OFF or deactivate message sent by the controller transceiver unit 16 to the valve transceiver unit 20 to deactivate the irrigation control valve 22 such that the irrigation control valve 22 stops the flow of water through the valve body. The example activate OFF message (FIG. 23) is similar to the activate ON message (FIG. 22) except that bit 7 in the activate OFF message can be a logic level zero to deactivate the irrigation control valve 22. While FIGS. 22 and 23 illustrate ON as logic level 1 and OFF as logic level zero, the reverse is also possible. The activate OFF message may be sent with a higher power level than the activate ON message to ensure that if an irrigation control valve were turned ON, it would be able to be turned OFF, even in a range-challenged situation.

Figure 16:
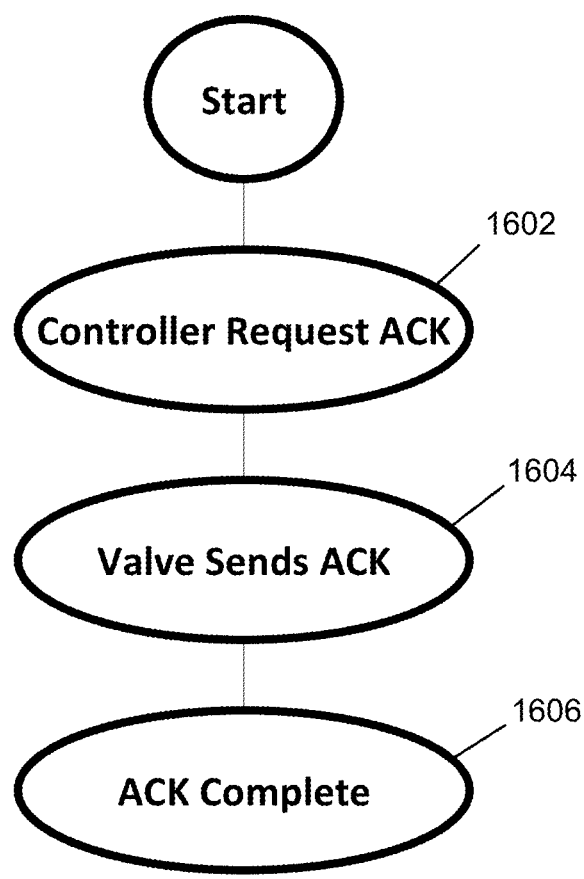
FIG. 16 is a flow diagram illustrating the operation of the ACK request flow process in the wireless irrigation system in accordance with an embodiment.

FIG. 16 is a flow diagram illustrating an example acknowledgement (ACK) request process between the controller transceiver unit 16 and the valve transceiver unit 20. The controller transceiver unit 16 may periodically initiate communication by sending a request ACK message at step 1602. When the message is received by the valve transceiver unit 20, then an ACK message is sent from the valve transceiver unit 20 at step 1604. FIG. 18 illustrates an example of a valve transceiver ACK message.

When the controller transceiver unit 16 does not receive this ACK message within a time period, then the controller transceiver unit 16 resends a request ACK message at step 1602 until the ACK message from the valve transceiver unit 20 is received at step 1604. The ACK request process is complete at step 1606.

When the controller transceiver unit 16 receives an ACK message that indicates that the state of the irrigation control valve 22 is in error, for example, the ACK message from the valve transceiver unit 20 indicates that the irrigation control valve 20 is ON when it should be OFF, then a message to correct the state can be sent to the valve transceiver unit 20.

When the controller transceiver unit 16 receives an ACK message that indicates a low battery, an LED indicator on the irrigation controller 12 or on the controller transceiver unit 16 can display a low battery message. In other embodiments, a low battery can be indicated by an LCD or an array of LEDs. In still other embodiments, wireless access to remote devices such as smart phones, smart watches, tablets or the like that can be used to display battery information to the user.

The ACK message may be sent by the valve transceiver unit 20 in response to other messages in addition to the ACK request message. For instance, anytime an ON or OFF message (FIG. 22 or 23) is sent by the controller transceiver unit 16, the valve transceiver unit 20 may respond with an ACK message, acknowledging receipt of the message from the controller transceiver unit 16. Additionally, under certain circumstances, such as changes in the battery's state of charge, the valve transceiver unit 20 may spontaneously transmit an ACK message (FIG. 18).

Figure 24:
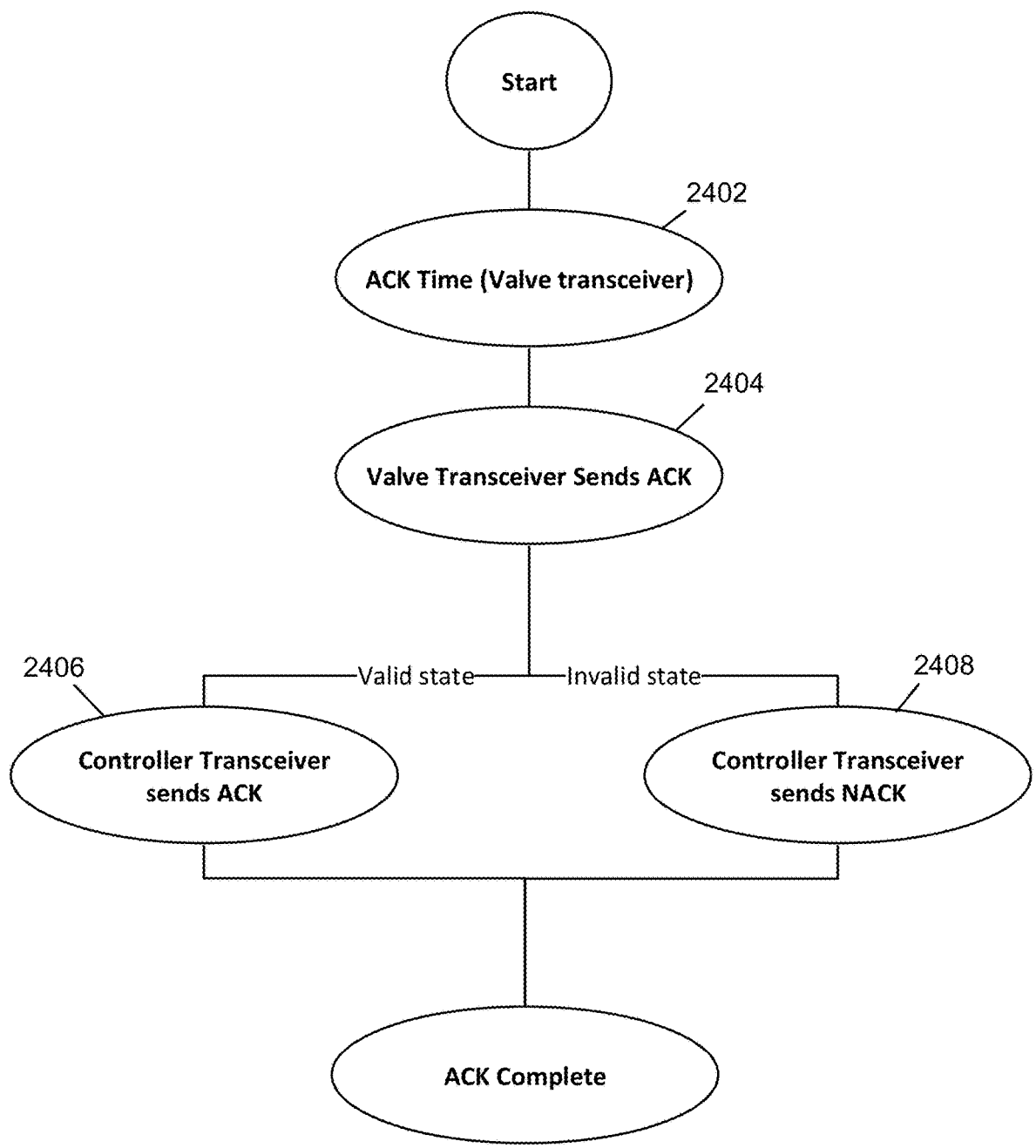
FIG. 24 is a flow diagram illustrating the operation of the ACK message flow process in the wireless system in accordance with an embodiment.

FIG. 24 is a flow diagram illustrating an example of the asynchronous initiation of the ACK message sent by the valve transceiver unit 20 to the controller transceiver unit 16. At step 2402, the valve transceiver unit 20 determines that an ACK message should be initiated. The ACK message sent by the valve transceiver unit 20 can be sent synchronously at regular intervals or asynchronously. For example, the valve transceiver unit 20 can send a valve transceiver ACK message when irrigation is occurring, after a timeout has occurred, where the timeout indicates that a message from the transceiver controller unit 16 has not been received with the timeout period, when a battery low condition occurs, to inform the transceiver controller unit 16 of the transmit signal strength or the RSSI, when constant state updates need to occur rapidly, and the like.

Once the valve transceiver unit ACK message is sent at step 2404, the controller transceiver unit 16 decodes the message and the informational content including the state of the irrigation control valve 22 and determines whether the state is in error. If the state of the irrigation control valve 22 is a valid state, the controller transceiver unit 16 sends a controller transceiver unit ACK message at step 2406 to the valve transceiver unit 20 signifying acceptance of the irrigation control valve state. An example of the controller transceiver unit ACK message is illustrated in FIG. 20. If the state of the irrigation control valve 22 is invalid, the controller transceiver unit 16 sends a controller transceiver unit NACK or non-ACK message at step 2408 to the valve transceiver unit 20. An example of the controller transceiver unit NACK message is illustrated in FIG. 21.

In contrast to the valve transceiver unit ACK message (e.g., FIG. 18), the controller transceiver unit ACK and NACK messages (e.g., FIGS. 20 and 21) confirm the state or reject the state of the irrigation control valve 22 relayed by the valve transceiver unit ACK message. Once the controller transceiver unit NACK message is received by the valve transceiver unit 20, the irrigation control valve state is set to an OFF state when the reported invalid state is an ON state.

In another aspect, the irrigation control valve state is set to an ON state when the reported invalid state is an OFF state.

One purpose of the valve transceiver unit ACK message is to acknowledge the receipt of a message from the controller transceiver unit 16, and to convey the state of the irrigation control valve 22 controlled by the valve transceiver unit 20. The valve transceiver unit ACK message can also be sent whenever a status change has occurred, such as a battery low indication, insufficient transmission power, communication failure, or the like. Using the valve transceiver unit ACK message in this way provides quick bidirectional feedback to the controller transceiver unit 16 that the valve transceiver unit 20 is receiving the messages and aids in diagnosis of any problems.

For example, when the battery in the valve transceiver unit 20 is low or within a low region, the controller transceiver unit 16 can be made aware of this state and provide an indication to the user that the battery needs to be changed. The irrigation control valve 22 can be placed into a safe state as a result of this process.

Another failure mechanism is low signal or receive strength leading to low bit error rates (BER) that can cause communication failures. This informational state message system also provides a method of dynamically increasing the power of the transmission in cases where there is low received signal strength and lowering it when the strength is sufficient. These signal strength increases must still be within regulatory limits but can dramatically increase range and reception where environmental noise is present and where landscaping or terrain make reception difficult. When the valve transceiver ACK message is received by the controller transceiver unit 16, the proper state of the valve transceiver unit 20 can be verified. Without this acknowledgement, the status change will be resent after a wait time of at least 5 seconds. In some embodiments the wait time is less than 5 seconds, or more than 5 seconds. Typically, the resend message will be sent at a higher transmit power level than the original message, if possible, within the FCC or governing body limits for the RF spectrum band.

Figure 25:
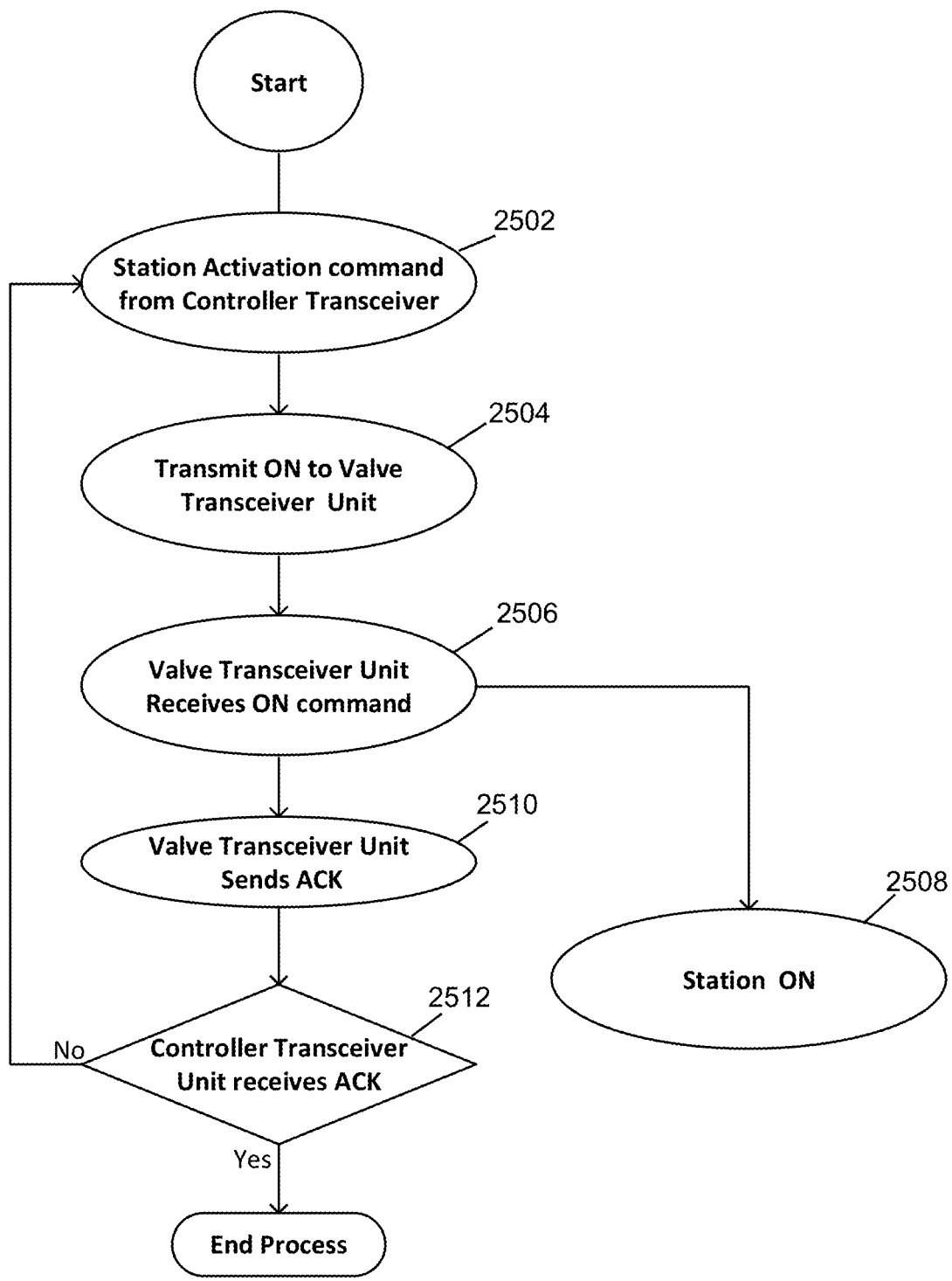
FIG. 25 is a flow diagram illustrating the operation of the activation ON message flow process in the wireless system in accordance with an embodiment.

FIG. 25 is a flow diagram illustrating the operation of the activation ON message flow process that occurs during irrigation control valve activation. At step 2502, the irrigation controller 12 activates a station output, either manually or automatically. This creates an electrical signal that is received by the controller transceiver unit 16 and then passed along wirelessly to the valve transceiver unit 20 as an activation ON message at step 2504. At step 2506, the valve transceiver unit 20 receives the activate ON command. At step 2508, the valve transceiver unit 20 sets the irrigation control valve 22 to allow water to flow and, at step 2510, acknowledges receipt of the activate ON message by sending a valve transceiver ACK message to the controller transceiver unit 16.

At step 2512, the controller transceiver unit 16 determines whether a communication from the valve transceiver unit 20 has been received. Periodic communications between the controller transceiver unit 16 and the valve transceiver unit 20 can indicate that the two-way wireless communication link 24 is functioning properly. When the controller transceiver unit 16 determines that a communication from the valve transceiver unit 20 has been received, the process ends.

No commands or status updates from the valve transceiver unit 20 received by the controller transceiver unit 16 can indicate a failure of the two-way communication link 24. The process moves from step 2512 to step 2502, where steps 2502-2512 are repeated until the controller transceiver unit 16 confirms that the valve transceiver unit 20 has received the activate ON command.

Figure 26:
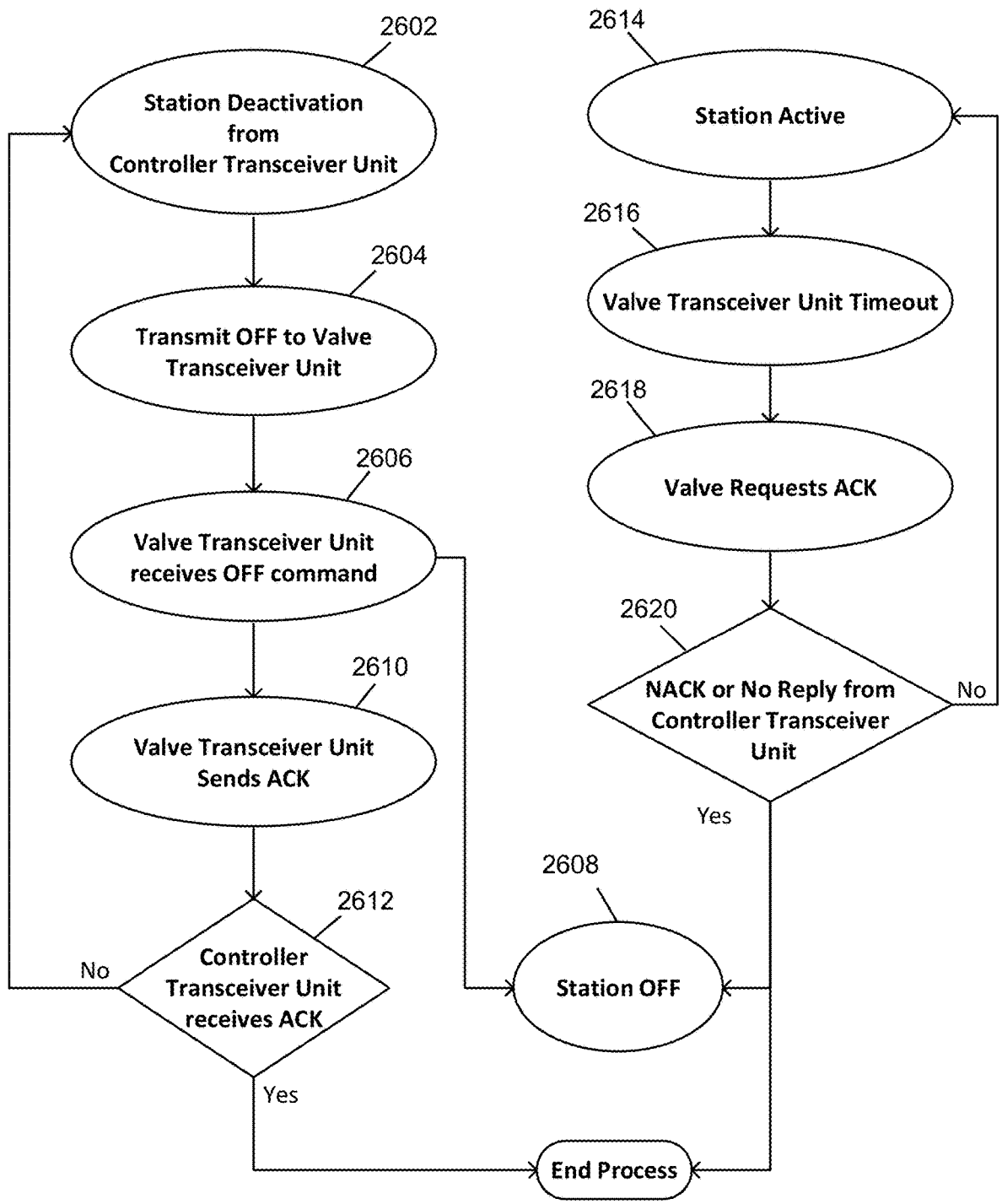
FIG. 26 is a flow diagram illustrating the operation of the activation OFF message flow process in the wireless system in accordance with an embodiment.

FIG. 26 is a flow diagram illustrating the operation of the activation OFF message flow process in the wireless system in accordance with an embodiment. Once the station output on the irrigation controller 12 is deactivated, the process illustrated in FIG. 26 is initiated. This activation OFF flow process illustrates two possible paths to deactivate the irrigation control valve 22.

The left side path outlines the method initiated by the irrigation controller 12. At step 2602, the irrigation controller 12 activates a station output, either manually or automatically. This creates an electrical signal that is received by the controller transceiver unit 16 and then passed along wirelessly to the valve transceiver unit 20 as an activation OFF message at step 2604. At step 2606, the valve transceiver unit 20 receives the activate OFF command. At step 2608, the valve transceiver unit 20 sets the irrigation control valve 22 to stop the flow of water, and, at step 2610, acknowledges receipt of the activate OFF message by sending a valve transceiver ACK message to the controller transceiver unit 16.

At step 2612, the controller transceiver unit 16 determines whether a communication from the valve transceiver unit 20 has been received. As described above, periodic communications between the controller transceiver unit 16 and the valve transceiver unit 20 can indicate that the two-way wireless communication link 24 is functioning properly. When the controller transceiver unit 16 determines that a communication from the valve transceiver unit 20 has been received, the process ends.

No commands or status updates from the valve transceiver unit 20 received by the controller transceiver unit 16 can indicate a failure of the two-way communication link 24. The process moves from step 2612 to step 2602, where steps 2602-2612 are repeated until the controller transceiver unit 16 confirms that the valve transceiver unit 20 has received the activate OFF command.

The right-side path of the flow diagram in FIG. 26 covers the possible condition where the deactivate message is not sent, cannot be sent, or is not received. At step 2614, the irrigation control valve 22 is active, having been previously turned ON.

At step 2616, the valve transceiver unit 20 reaches a programmed timeout period. The propose of this timeout period is to initiate an ACK command to confirm that a communications link still exists between the controller transceiver unit 16 and the valve transceiver unit 20 and that the irrigation control valve 26 is in a valid state. The timeout period can be 10 seconds, one minute, 5 minutes, 10 minutes, 15 minutes, and the like. In some embodiments, the timeout period can be a predetermined period of time that may range between 10 seconds and 15 minutes. In one embodiment, the timeout period is programmable. In another embodiment, the timeout period is tunable. In another embodiment, the timeout period can be included in the message from the controller transceiver unit 16.

If timeout is reached then, at step 2618, the valve transceiver unit 20 sends a message to the controller transceiver unit 16 requesting a controller transceiver ACK message.

At step 2620, the valve transceiver unit 20 determines whether the controller transceiver unit 16 sent a control transceiver ACK message, sent a controller transceiver NACK message, or did not send any message.

When the controller transceiver unit 16 sends a controller transceiver NACK message, the process moves to step 2608. Receipt of a controller transceiver NACK message indicates that the irrigation control valve 22 is in an invalid state and the valve transceiver unit 20 sets the irrigation control valve 22 such that water is prevented from flowing through the irrigation control valve 22. In an embodiment, this can be considered a precaution to prevent unwanted watering from occurring when there is a failure of the two-way communication link.

When the controller transceiver unit 16 fails to reply, the process also moves to step 2608. Failure to send a response indicates a failure of the two-way wireless communication network and the valve transceiver unit 20 sets the irrigation control valve 22 such that water is prevented from flowing through the irrigation control valve 22. In an embodiment, this can be considered a precaution to prevent unwanted watering from occurring when there is a failure of the two-way communication link. In another embodiment, the valve transceiver unit 20 may set the irrigation control valve 22 to the OFF state at the end of the timeout period with or without requesting an ACK from the controller transceiver unit 16.

When the controller transceiver unit 16 sends a controller transceiver ACK message to the valve transceiver unit 20, the process moves to step 2614, where steps 2614-2620 are repeated until the irrigation control valve 22 is set to an OFF state at step 2608. Receipt of the controller transceiver ACK message indicates that the irrigation control valve 22 is in a valid state.

Example of Wireless Valve Transceiver Unit Circuitry

Figure 27:
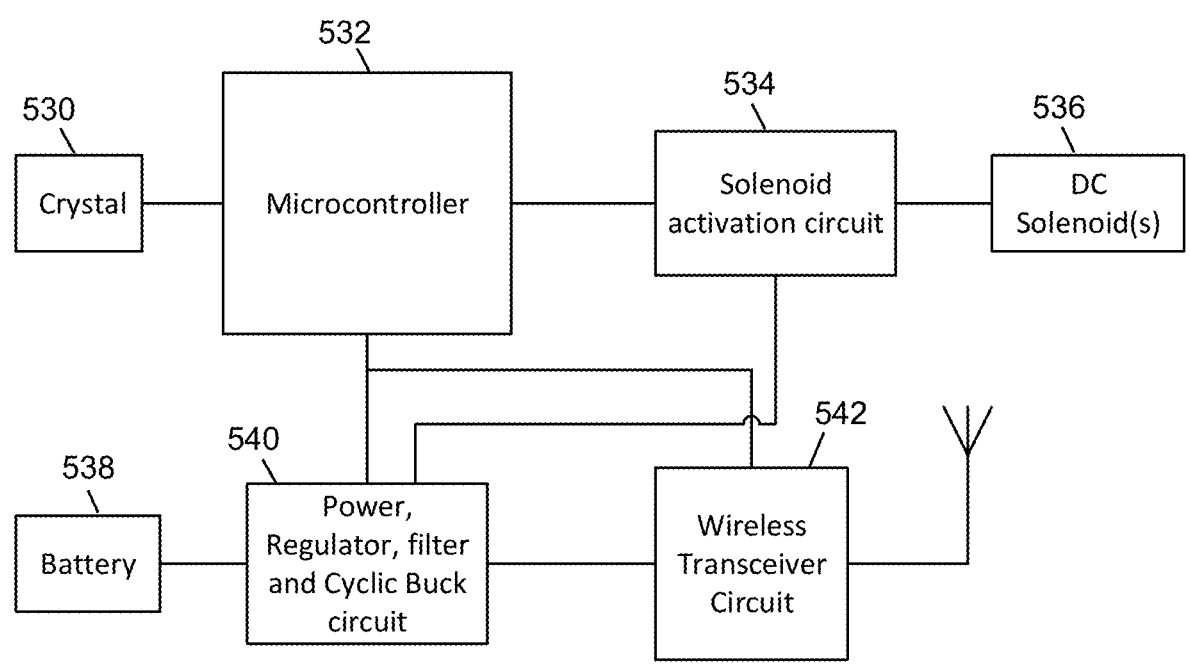
FIG. 27 is a block diagram illustrating the valve transceiver unit circuitry in accordance with an embodiment.

FIG. 27 is a block diagram illustrating the wireless valve transceiver unit circuitry in accordance with an embodiment. The illustrated wireless valve transceiver of FIG. 27 comprises a crystal 530, a microcontroller 532, a solenoid activation circuit 534, one or more solenoids 536, a battery 538, a power circuit 540, and a wireless transceiver circuit 542. In an embodiment, the microcontroller 532 can be a Microchip PIC18F86K90 microcontroller. The microcontroller 532 can be powered, along with the transceiver unit 542 and solenoid activation circuit 534, by the battery 538.

The battery 538 can have a minimum voltage of approximately 5 volts and have a maximum voltage of greater than approximately 12 volts. In an embodiment, the battery 538 is a 9V DC battery. In one embodiment the battery 538 has a PP3 form factor. Other embodiments include a rechargeable battery or a solar rechargeable system. The battery power voltage from the battery 538 can be modified and regulated by power circuit 540, which can include the cyclic buck circuit of FIG. 14. In one embodiment, a nominal voltage of 3.3 volts is used.

The crystal 530 is used to keep timing for signal reception and internal timing for the microcontroller 532. In an embodiment, the crystal 530 comprises a 32 kHz crystal. The solenoid activation circuit 534 can include charging a capacitor to a nominal voltage of 11 volts or greater and discharging the capacitor through the irrigation control valves 22 in a pulse to activate or deactivate the DC solenoids 536. Using the capacitor as a voltage/pulse reservoir, the same circuit can be used to activate or deactivate the irrigation control valve 22. In an embodiment, the solenoid activation circuit 534 can control a plurality of irrigation control valves 22. In an embodiment, the solenoid activation circuit 534 can control up to 6 irrigation control valves 22. In other embodiment, more than 6 irrigation control valves 22 can be controlled by the solenoid activation circuit 534.

The wireless transceiver circuit 542 can comprise, but not limited to, a LoRa chip SX1276 from Semtech. The wireless transceiver circuit 542 can receive messages from the controller transceiver unit 16. After demodulating and decoding the received messages, the decoded messages are acted upon by the microcontroller 532. Whenever an activate ON or activate OFF message is received by the valve transceiver unit 20, the microcontroller 532 will cause the activation or deactivation the irrigation control valve 22 through the solenoid activation circuit 534. The valve transceiver unit 20 can also comprise an embedded microcontroller with a built in analog to digital converter (ADC). This ADC continuously monitors the battery state and once the battery goes into a low battery state, the charging circuit for the irrigation control valve 22 is activated to disable the associated solenoid if it is in the ON state. For example, there can be a bulk aluminum electrolytic capacitor as a charge reservoir to handle the extra current if the battery 538 is nearly discharged.

When an activate ON signal is received and the solenoid of the irrigation control valve 22 is activated by the valve transceiver unit 20, the controller transceiver unit 16 can maintain the bi-direction communication process through the ACK messages and responses to status. If an interruption to this process occurs, which may occur due to power outages, RF interference or noise blocking communications, or other reasons; the valve transceiver unit 20 responds to the non-responsive state by shutting OFF all active irrigation control valves 22. This non-responsive state may not occur until a minimum of approximately 12 seconds elapses to accommodate transitory interference or power glitches. Subsequent resumption of bi-directional communication can restore the ability to control valve states.

Many of the systems, methods and functions described herein have been described as comprising the Microchip PIC18F86K90. However, many of these electronic functions and implementations can be realized using field programmable gate arrays, complex programmable logic devices and the like. Similarly, the RF functions that can be implemented using the Semtech SX1276 can also be implemented using software defined radio, other vendor supplied RF integrated circuits and components, and digital logic. The specified software and processes running on the microcontroller and the LoRa integrated circuit can also be implemented as a state machine in hardware design logic using programmable arrays and higher-level hardware description languages such as VHDL or Verilog. Similarly, some of the hardware-based functions described herein may be fully realized in software running on microcontrollers or microprocessors. Similarly, the circuitry of the controller transceiver unit may be permanently installed in the irrigation controller resulting in a physically smaller overall package. Numerous variations and implementations can be made to this invention by those skilled in the art without deviating from the extent of the present invention.

In any of the configurations described above, it can be possible for a user to create an association between a controller transceiver and two or more solenoid valve transceivers so that two or more valves may operate from a single station output signal.

Communication Techniques

Host Irrigation Controller Communicates with Controller Transceiver Unit Module

FIGS. 1 and 2 illustrate the communication path of the wireless irrigation system 10, 30 between the irrigation controller 12, 32, the controller transceiver unit module 16, 36, and the valve transceiver unit module 20, 48. As described above, this communication comprises an electrical signal that is converted into an RF signal for the intent of controlling the valve transceiver unit module 20, 48, or, in some aspects, starting a valve 22, 50 manually as part of the setup process for the wireless irrigation system 10, 30.

Auxiliary Communication Device

Figure 28:
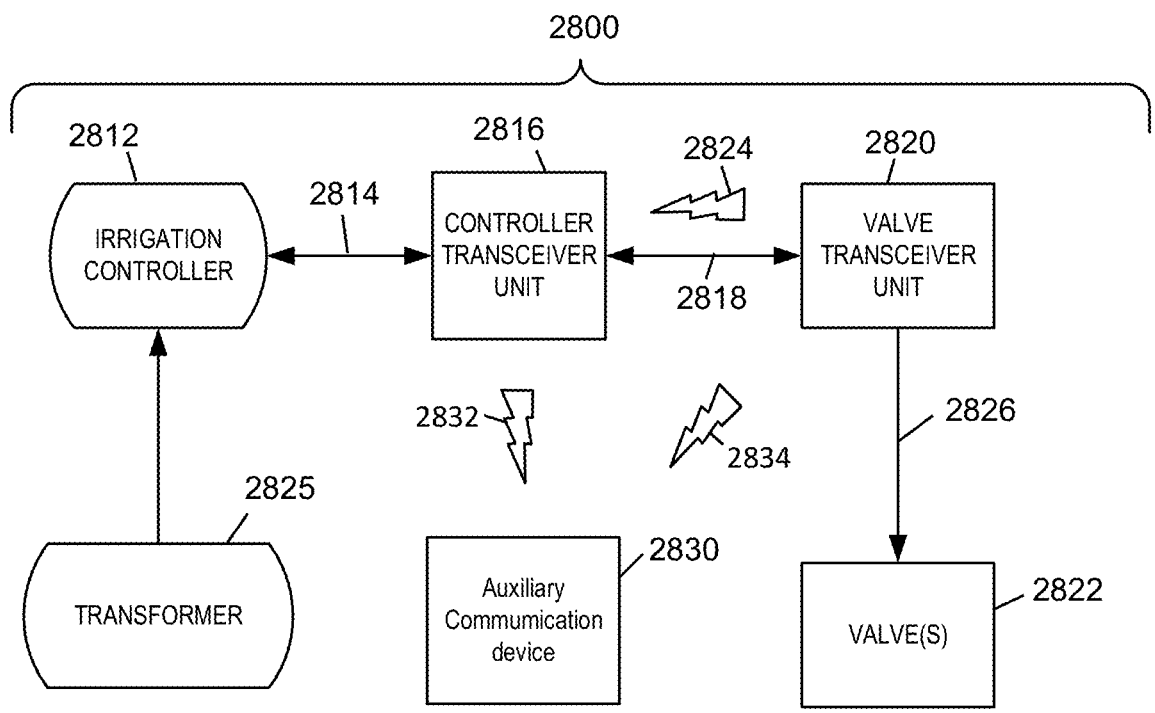
FIG. 28 simplified block diagram of a wireless irrigation system with wireless irrigation control valves and an auxiliary communication device in accordance with an embodiment.

FIG. 28 is a simplified block diagram of a wireless irrigation system 2800 with wireless irrigation control valves and an auxiliary communication device in accordance with an embodiment. Similar to the irrigation system 10 illustrated in FIG. 1, the wireless irrigation system 2800 is configured to wirelessly transmit irrigation control signals from an irrigation controller 2812, such as a conventional irrigation controller that is configured to provide irrigation control signals over a wired physical connection, to one or more irrigation control valves 2822 that are configured to receive the irrigation control signals over the wired physical connection, without providing the physical connection between the irrigation controller 2812 and the irrigation control valves 2822.

In the illustrated embodiment, the irrigation system 2800 comprises the irrigation controller 2812, a transformer 2825 configured to supply power to the irrigation controller 2812, a controller transceiver unit module 2816, a valve transceiver unit module 2820, and the irrigation control valve(s) 2822.

The irrigation controller 2812 is configured to receive user input directed to a watering schedule and provide signals configured to control landscape irrigation in response to the user input. In an embodiment, the irrigation controller 2812 is configured to provide electrical signals over a physical connection 2814 to the controller transceiver unit module 2816, which converts the electrical signals from the irrigation controller 2812 to radio-frequency (RF) signals that are sent to the valve transceiver unit module 2820 over a wireless link 2824. The valve transceiver unit 2820 converts the RF signals to electrical signals in a format that is usable to the irrigation control valve 2822 and sends the electrical signals over the wired physical connection 2826 to the irrigation control valve 2822 to control the opening and closing of the valve body according to the watering schedule. In combination, the valve transceiver unit module 2820 and the irrigation control valve 2822 comprise a wireless irrigation control valve.

The wireless irrigation system 2800 further comprises an auxiliary communication device 2830 to communicate with the controller transceiver unit module 2816. In an aspect, the auxiliary communication device 2830 includes a remote user interface.

The auxiliary communication device 2830 can be used to communicate user commands to the controller transceiver unit module 2816. In some aspects, the user commands are used to create associations between the controller transceiver unit module 2816 and each of the valve transceiver unit modules 2820. In other aspects, the auxiliary communication device 2830 can communicate with the valve transceiver unit module 2820. In other aspects, the user commands can retrieve battery status from the VTU through the CTU, or retrieve information about the integrity of the RF link between CTU and VTU, or download new firmware to either CTU or VTU. The communication link 2832 between the auxiliary communication device unit 2830 and the controller transceiver unit module 2816 or the communication link 2834 between the auxiliary communication device unit 2830 and the valve transceiver unit module 2820 can be, for example, an RF communication link such as Bluetooth, which may be considered a short range RF communication link, a close field communication link such as an inductive communication link, or an optical communication link.

Separate Device Communicates with CTU Module or VTU Module Using Induction.

Figure 29:
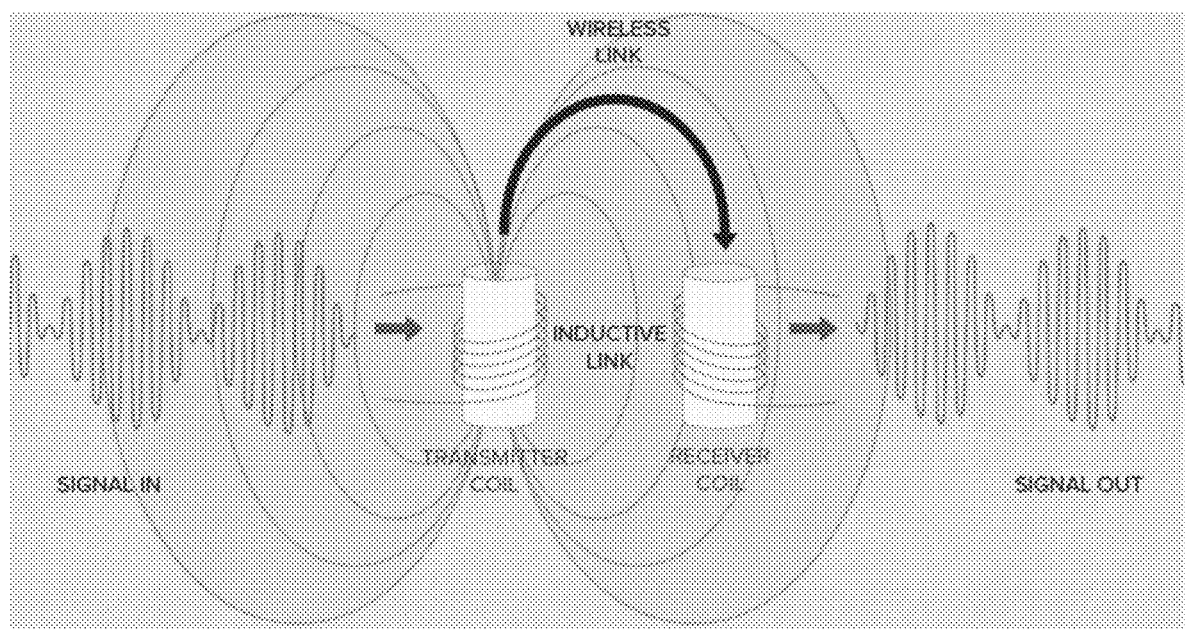
FIG. 29 is a schematic diagram illustrating inductive communication in accordance with an embodiment.

Inductive communication involves bringing two inductors close enough together that when an AC current exists in one of the inductors, the resulting magnetic field induces a similar current in the second inductor. FIG. 29 is a schematic diagram illustrating inductive communication in accordance with an embodiment. As long as the two inductors are relatively close and oriented such that the magnetic flux lines of one have a component perpendicular to the plane of the coils in the other, communication can be established. Some advantages of inductive communication are that simple and inexpensive components are used, lower frequencies can be used than can be used in typical RF links so spurious emission are reduced, and because inductive links are typically short-range, they are more secure and less susceptible to eavesdropping. Inductive communication can be used to allow the auxiliary communicate device to communicate with one or more of a controller transceiver unit module 2816 or a valve transceiver unit module 2820. In some aspects, inductive communication can be used to provide communication between a controller transceiver unit module 2816 and a valve transceiver unit module 2820, in addition or in lieu of the RF link disclosed herein.

Figure 30:
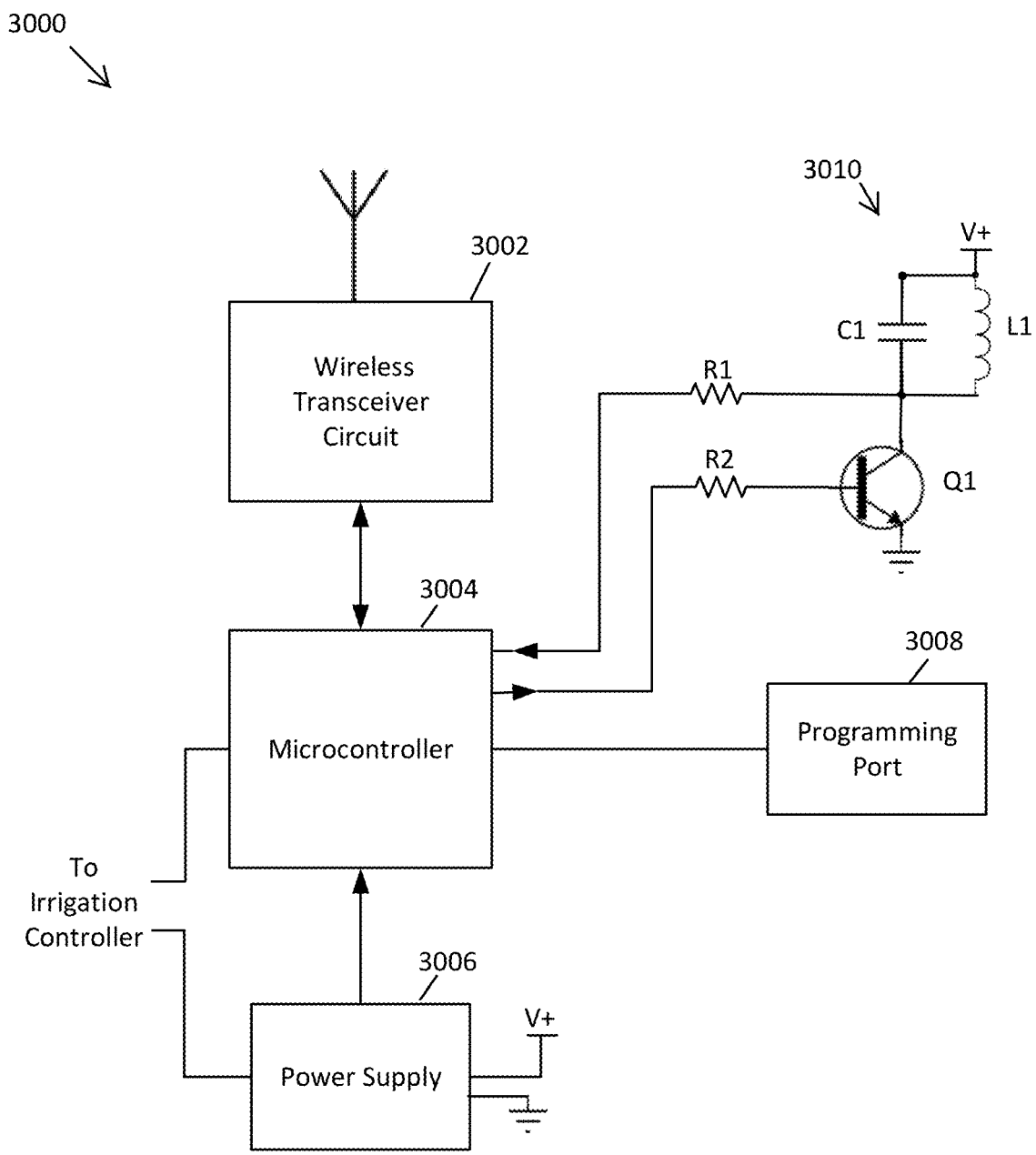
FIG. 30 is block diagram illustrating a controller transceiver unit module with inductive communications capability in accordance with an embodiment.

FIG. 30 is block diagram illustrating a controller transceiver unit module 3000 with inductive communications capability in accordance with an embodiment. The controller transceiver unit module 3000 comprises a wireless transceiver circuit 3002, a microcontroller 3004, a power supply 3006, a programming port 3008 and a communication circuit 3010 for inductive communication. The communication circuit 3010 comprises inductor L1, capacitor C1, transistor Q1, and resistors R1 and R2. For transmission, a logic level square wave signal from the microcontroller 3004 is buffered by transistor Q1 to drive the LC tank circuit of L1 and C1. The frequency of the square wave is typically chosen to match the resonant frequency of the tank circuit. For reception, an alternating magnetic field (having a frequency matching or approximately matching the resonant frequency of the LC tank circuit) will cause an alternating current to be introduced in inductor L1. This alternating current results in a voltage which is received by the microcontroller 3004. Resistors R1 and R2 limit the current flowing into and out of the microcontroller.

Figure 31:
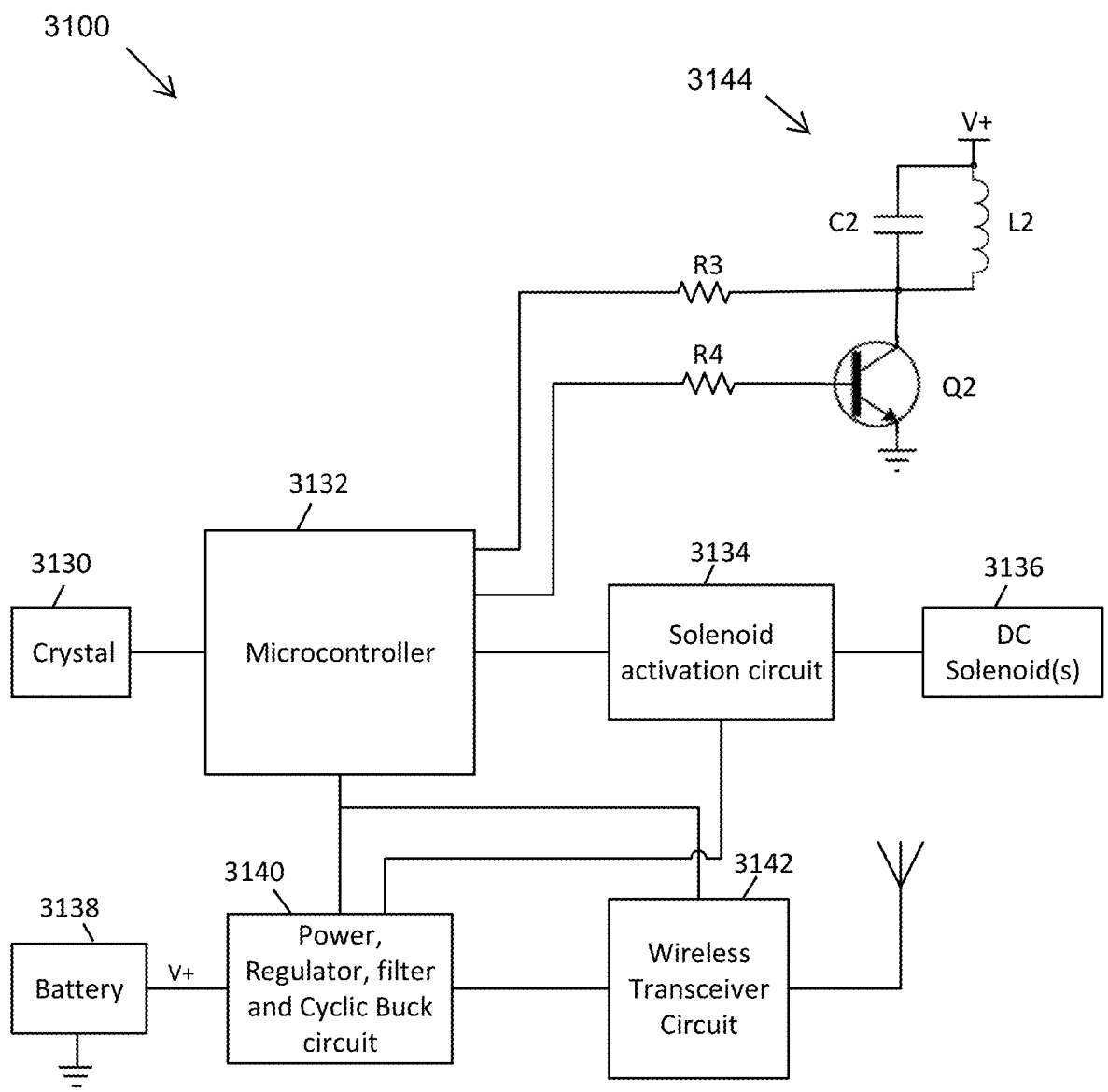
FIG. 31 is block diagram illustrating a valve transceiver unit module with inductive communications capability in accordance with an embodiment.

FIG. 31 is block diagram illustrating a valve transceiver unit module 3100 with inductive communications capability in accordance with an embodiment. The valve transceiver unit module 3100 comprises the crystal 3130, the microcontroller 3132, the solenoid activation circuit 3134, the DC solenoid(s) 3136, the battery 3138, the power, regulator, filter, and cyclic buck circuit 3140, and the wireless transceiver 3142 as described above with respect to FIG. 27. The valve transceiver unit module 3100 further comprises a communication circuit 3144 for inductive communication. Similar to the communication circuit in FIG. 30, the communication circuit 3100 in FIG. 31 comprises inductor L2, capacitor C2, transistor Q2, and resistors R3 and R4. For transmission, a logic level square wave signal from the microcontroller 3132 is buffered by transistor Q2 to drive the LC tank circuit of L2 and C2. The frequency of the square wave is typically chosen to match the resonant frequency of the tank circuit. For reception, an alternating magnetic field (having a frequency matching or approximately matching the resonant frequency of the LC tank circuit) causes an alternating current to be introduced in inductor L2. This alternating current results in a voltage which is received by the microcontroller 3132. Resistors R3 and R4 limit the current flowing into and out of the microcontroller 3132.

The communication circuits 3010, 3144 for inductive communication can be used to allow a controller transceiver unit module 2816, 3000 or a valve transceiver unit module 2820, 3100 to communicate with the auxiliary communication device 2830. The auxiliary communication device 2830 can be a stand-alone device or may connect to another device such as a smartphone, tablet, laptop, workstation, or the like. The connection from the auxiliary communication device to these other devices may be via the audio jack, USB, proprietary interface, or Bluetooth.

Figure 32:
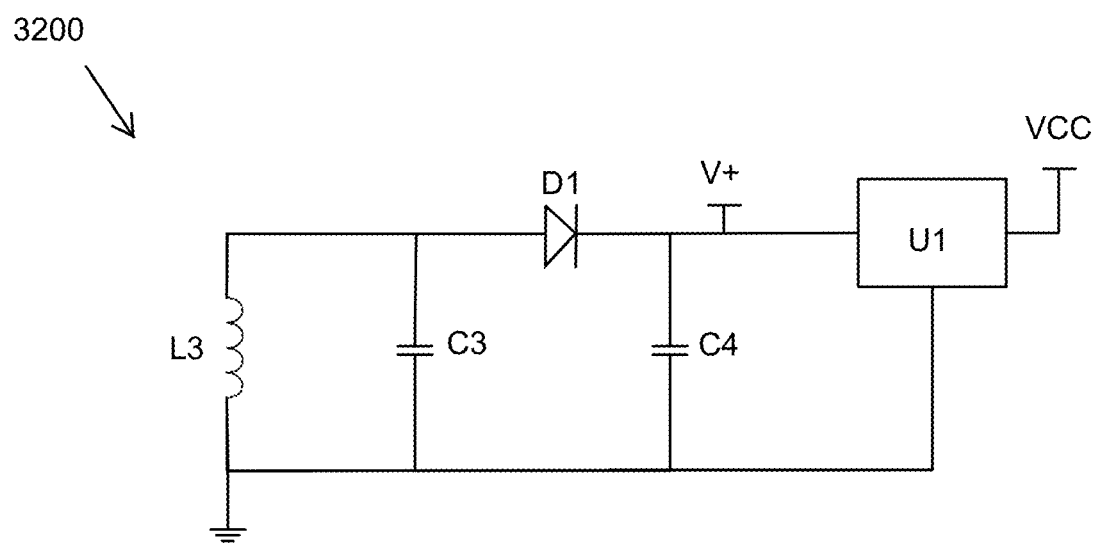
FIG. 32 is a schematic diagram of an example circuit configured to derive power from an inductive signal in accordance with an embodiment.

In some aspects, when the inductors are close, it is also possible to use the received signal to power the receiving device. FIG. 32 is a schematic diagram of an example circuit 3200 configured to derive power from an inductive signal in accordance with an embodiment. In this embodiment, an alternating current is induced in inductor L3 (due to the presence of an alternating magnetic field). Diode D1 rectifies this current and capacitor C4 filters the resulting voltage which is fed into voltage regulator U1. Voltage regulator U1 can supply power to the remaining circuits (not shown).

Separate Device Communicates with CTU Module or VTU Module Using Bluetooth.

In another aspect, the controller transceiver unit module 2816 and the auxiliary communication device 2830 comprise a short-range wireless communication device, such as a Bluetooth transceiver, which allows them to exchange information. Examples of a Bluetooth transceiver are BGM13P22F512GA available from Silicon Labs, CC2642R1FRGZR available from Texas Instruments, or any similar part.

Figure 33:
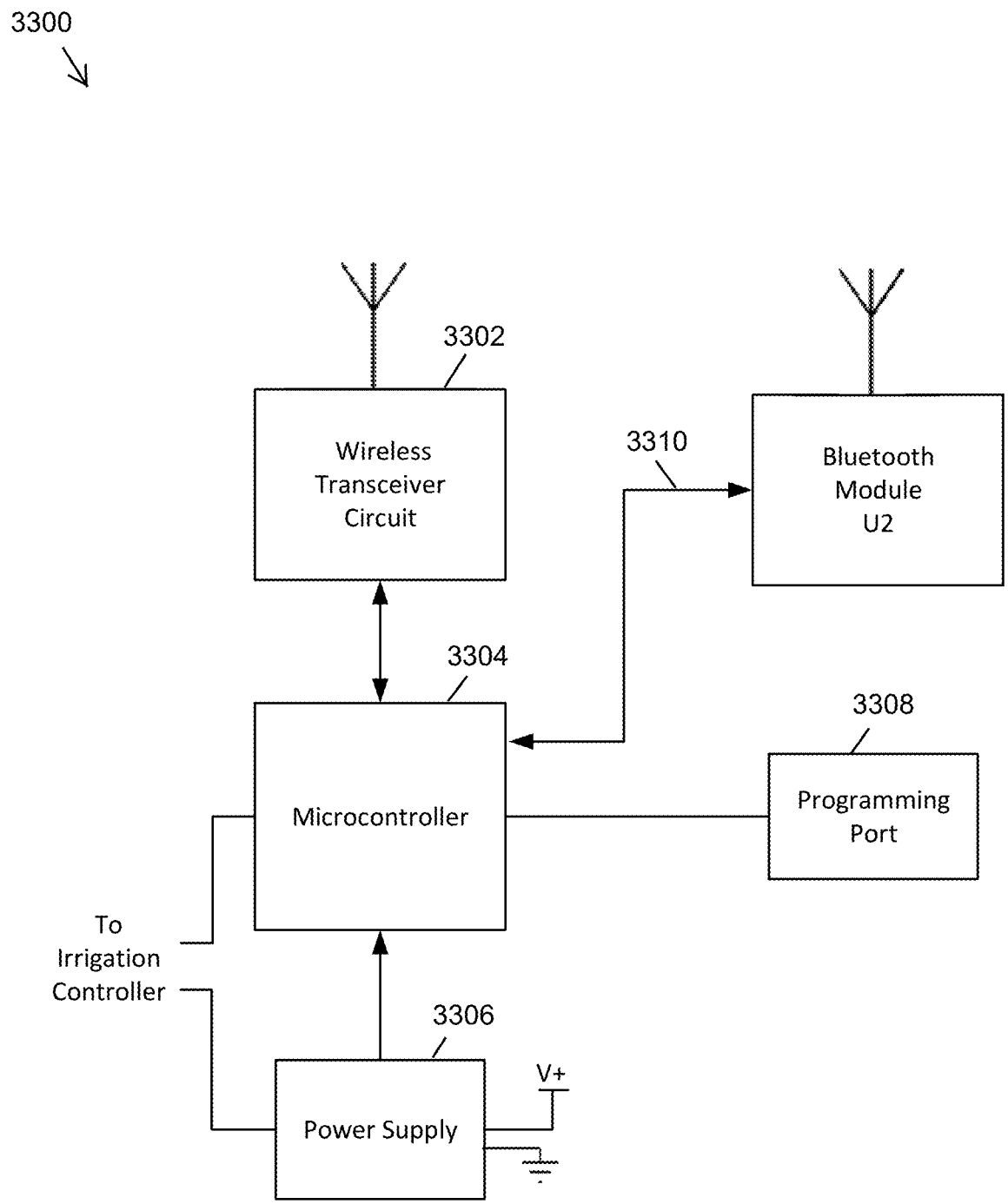
FIG. 33 is block diagram illustrating a controller transceiver unit module with Bluetooth [short-range wireless RF communication] communications capability in accordance with an embodiment.
Figure 34:
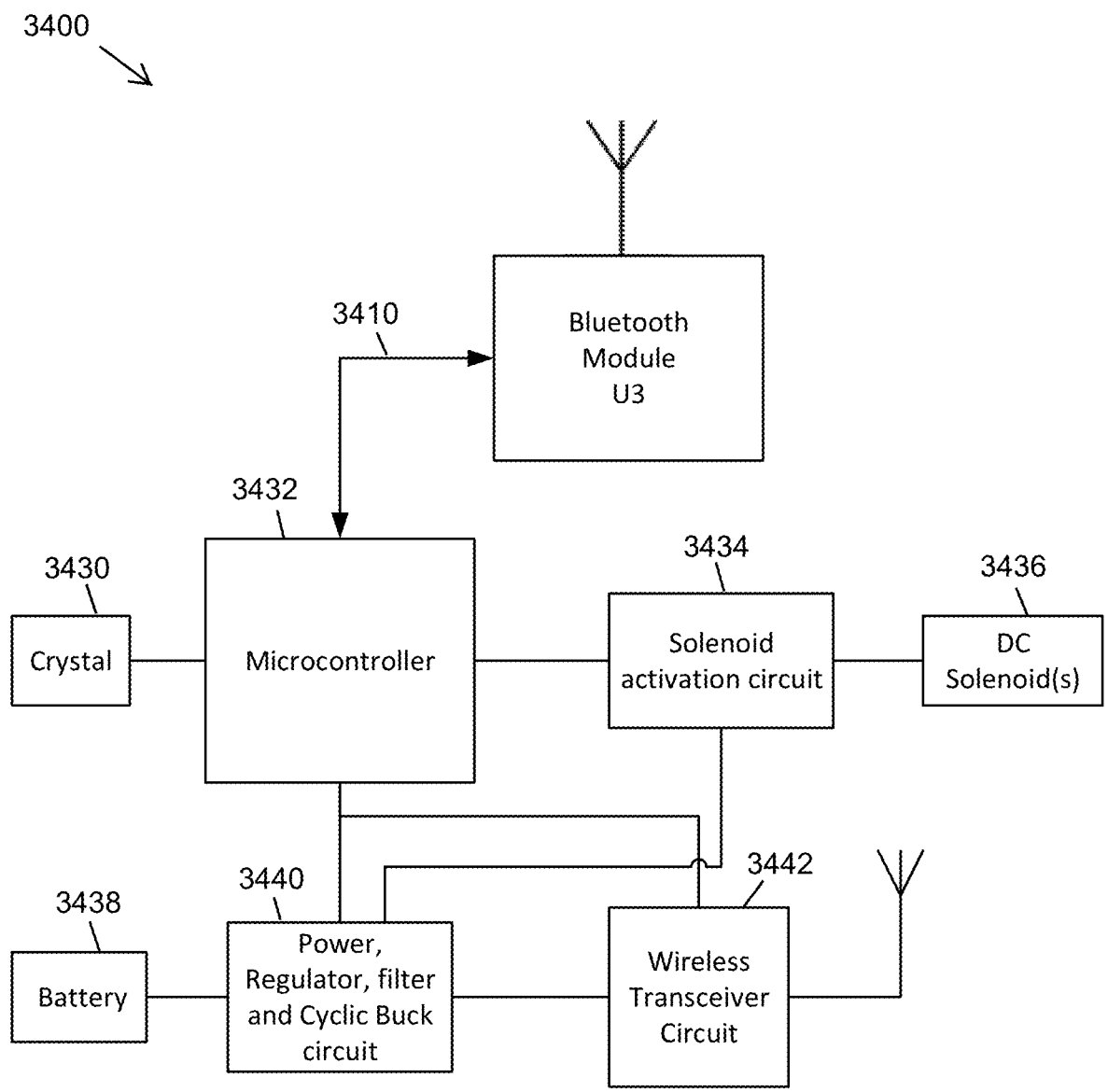
FIG. 34 is block diagram illustrating a valve transceiver unit module with Bluetooth [short-range wireless communication] communications capability in accordance with an embodiment.

FIG. 33 is block diagram illustrating a controller transceiver unit module 3300 with integrated Bluetooth or other short-range wireless communications capability in accordance with an embodiment. The controller transceiver unit module 3300 comprises a wireless transceiver circuit 3302, a microcontroller 3304, a power supply, a programming port 3308 and a Bluetooth module U2. FIG. 34 is block diagram illustrating a valve transceiver unit module 3400 with integrated Bluetooth or other short-range wireless communications capability in accordance with an embodiment. The valve transceiver unit module 3400 comprises the crystal 3430, the microcontroller 3432, the solenoid activation circuit 3434, the DC solenoid(s) 3436, the battery 3438, the power, regulator, filter, and cyclic buck circuit 3440, and the wireless transceiver 3442 as described above with respect to FIG. 27. The valve transceiver unit module 3400 further comprises a Bluetooth module U3. Connections 3310, 3410 between the Bluetooth Module U2, U3 to the microcontroller 3304, 3432, respectively, represents the communication method used. Depending on the Bluetooth module U2, U3, this could be UART, SPI, I2C parallel, or proprietary interfaces. The auxiliary communication device 2830 may be any device comprising a Bluetooth transceiver, such as a smartphone, tablet, laptop, workstation, or proprietary hardware.

Separate Device Communicates with CTU or VTU using Optical Communication.

In other aspects, a visible or invisible light signal can be used to allow communication between 1) CTU and an auxiliary communication device, 2) VTU and an auxiliary communication device, or 3) CTU and VTU. Infra-red (IR) communications are discussed below, but the same or similar techniques can be applied to other optical signals or circuits, such as, for example, UV, red, green, blue, white or any other visible or invisible light source/detector. In one example, the detector could consist of the camera on a smartphone, tablet, laptop, or other similar device. Often, for bi-directional communications, an IR transmitter and IR receiver are used. The IR transmitter and IR receiver can be packaged in a single package or they can be discrete components. An example of a packaged IR transmitter and receiver is TFDU4301 manufactured by Vishay, or the like. An example of a discrete IR transmitter is SFH4550 manufactured by Osram, or the like. An example of a discrete IR receiver is WP3DPD1C manufactured by Kingbright.

Figure 35:
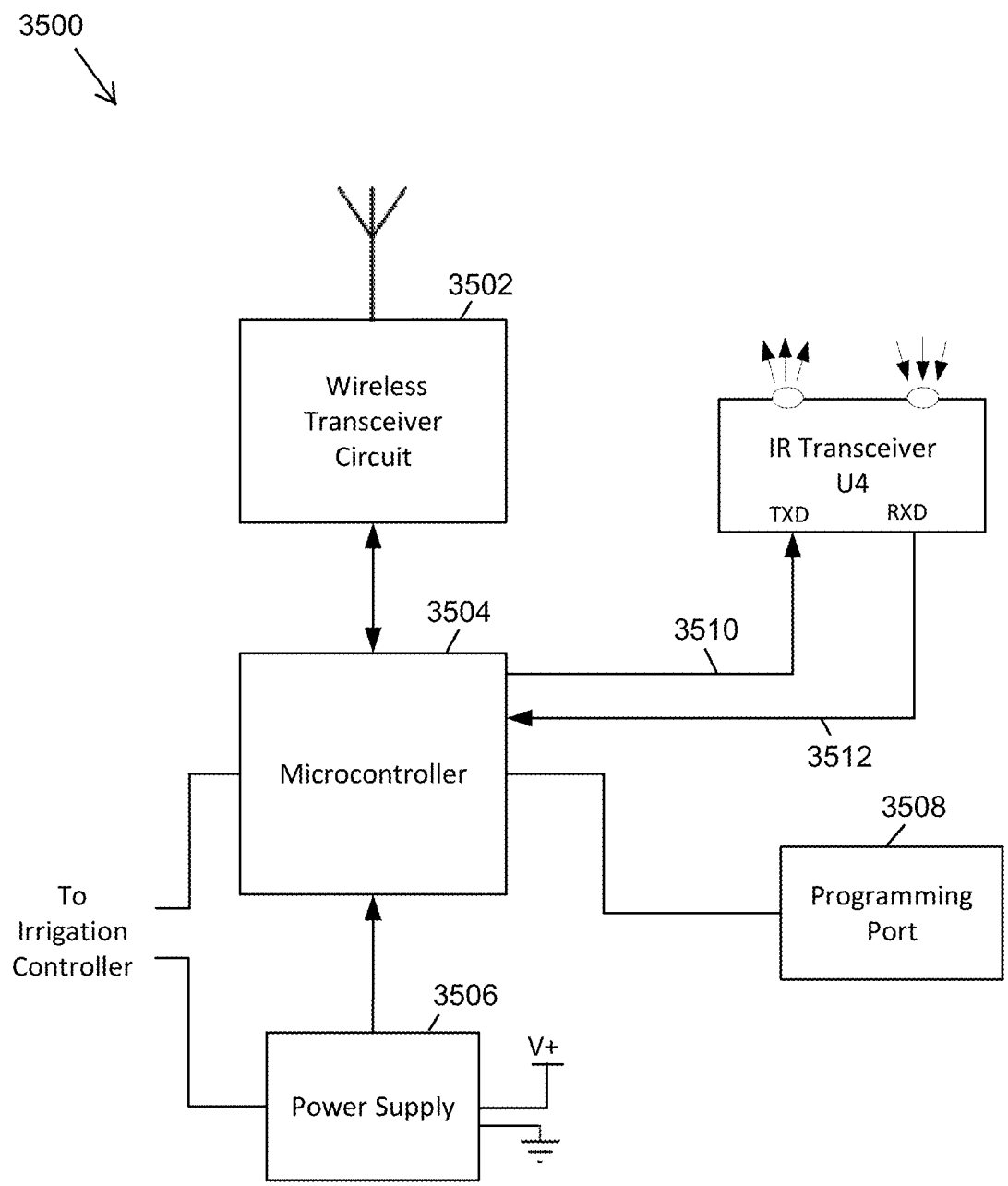
FIG. 35 is block diagram illustrating a controller transceiver unit module with optical communications capability in accordance with an embodiment.
Figure 36:
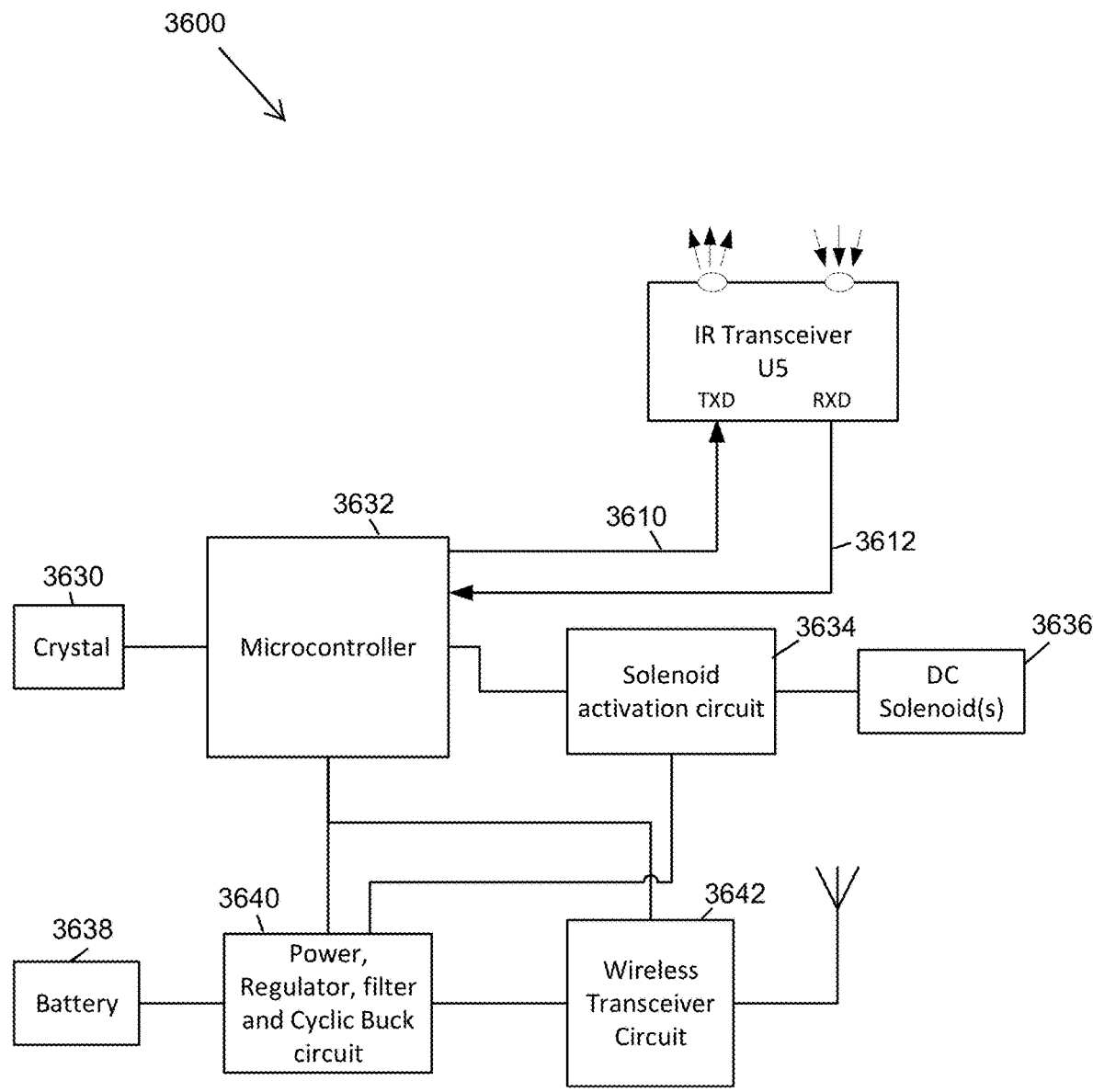
FIG. 36 is block diagram illustrating a valve transceiver unit module with optical communications capability in accordance with an embodiment.

FIG. 35 is block diagram illustrating a controller transceiver unit module 3500 with optical communications capability in accordance with an embodiment. The controller transceiver unit module comprises a wireless transceiver circuit 3502, a microcontroller 3504, a power supply 3506, a programming port 3508 and an IR transceiver U4. FIG. 36 is block diagram illustrating a valve transceiver unit module 3600 with optical communications capability in accordance with an embodiment. The valve transceiver unit module 3600 comprises the crystal 3630, the microcontroller 3632, the solenoid activation circuit 3634, the DC solenoid(s) 3636, the battery 3638, the power, regulator, filter, and cyclic buck circuit 3640, and the wireless transceiver 3642 as described above with respect to FIG. 27. The valve transceiver unit module 3600 further comprises an IR transceiver U5. In FIGS. 35 and 36, transmit serial data lines 3510, 3610 and receive serial data lines 3512, 3612, respectively, from the microcontroller 3504, 3632 send information to and receive information from the IR transceiver U4, U5 over the IR links. In the example illustrated in FIGS. 35 and 36, the signal buffering and conditioning is performed within the IR transceiver U4, U5. If discrete transmitter/receiver devices were used, these functions would be provided by additional circuitry. The auxiliary communication device 2830 comprising IR communication capability and communicating with the CTU or VTU may be stand-alone or may connect to another device such as a smartphone, tablet, laptop or workstation. The connection to these other devices may be via the audio jack, USB, proprietary interface, or Bluetooth. Alternatively, the camera/flashlight of the smartphone, tablet, or similar device with optical features can communicate directly with the CTU or VTU via optical communication.

Functionality with Host Irrigation Controller

Associating a VTU with a CTU

Certain embodiments described herein involve using a face pack of an irrigation controller as a component of the association process to associate a controller transceiver unit module with a valve transceiver unit module. In an aspect, the functionality of the face pack in the sequence of steps to establish the association is the same or similar for an irrigation controller with a CTU and for an irrigation controller without a CTU. For example, the face pack can be used to start a station manually to initiate the association process and then select a button or indicator on the VTU or attach the VTU to a programming port on the CTU or the irrigation controller. This advantageously allows the wireless irrigation system to be deployed on existing installations with installed irrigation controllers whose face packs include software instructions/code written long ago having no awareness of the wireless irrigation system.

Additional Functionality of the Face Pack for an Improved User Experience

The face pack display can include additional screens on its display. In some aspects, the face pack display can have a screen dedicated to the "association" function, thereby eliminating the need to start a station manually. The same or another screen can include a field where the user can adjust the valve that is associated with the VTU. The same or another screen can be used to set the RF channel. Additionally, the same or another screen can provide diagnostic or status information, such as an indication of which VTU's are presently communicating with the CTU, an indication of the signal strengths (RSSI) for each VTU, an indication of the signal to noise ratio of each VTU, an indication of the battery status for each VTU, an indication of the communication status of each VTU (connected, disconnected, and intermittent), an indication of the firmware revision of the CTU and each VTU, an indication of the hardware revision of the CTU and each VTU. The face pack can include programming configured to push any diagnostic, status or fault information associated with the wireless irrigation system to the cloud for cloud-connected irrigation controllers that are disclosed herein. Further, the face pack can include programming configured to transmit new firmware, firmware revisions, or firmware patches to the CTU or VTU.

In one aspect, the communication channel between the face pack and the CTU, described herein, can be utilized to implement and communicate the additional functionality.

The induction communication link described herein permits the CTU or VTU to communicate with the auxiliary communication device 2830, such as a stand-alone auxiliary communication device or with an auxiliary communication device that is in electrical communication with a smartphone or tablet through the audio jack, USB connection, proprietary interface, or Bluetooth interface. The stand-alone communication device or the combination communication device comprises at least a user interface having interface components, such as buttons, dials, display(s), touchscreen(s), LEDs, speakers, microphone, etc., that would be used to enable setup and implement the additional functionality.

The short-range wireless communication link, such as Bluetooth for example, permits the CTU or VTU to communicate with another device that has Bluetooth capability, such as a smartphone or tablet. Such a device has a user interface that a user uses to enable setup and implement the additional functionality.

The optical communication link described herein permits the CTU or VTU to communicate with the auxiliary communication device 2830, such as an optical communications enabled, stand-alone auxiliary communication device or with an auxiliary communication device that is in electrical communication with a smartphone or tablet through the audio jack, USB connection, proprietary interface, or Bluetooth interface. The stand-alone communication device or the combination communication device comprises at least a user interface having interface components, such as buttons, dials, display(s), touchscreen(s), LEDs, speakers, microphone, etc., that would be used to enable setup and implement the additional functionality.

Terminology

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. An irrigation system comprising:
   an irrigation controller configured to provide one or more valve activation signals, each valve activation signal configured to control an associated irrigation valve;
   a valve transceiver configured to control a selected irrigation valve;
   an auxiliary communication device configured to receive user input and to send a first message over an inductive communication link; and
   a controller transceiver configured to receive, from the irrigation controller, a selected activation signal of the one or more valve activation signals, the controller transceiver comprising:
      a wireless transceiver in communication, over a wireless communication link, with the valve transceiver;
      circuitry for inductive communication in communication, over the inductive communication link, with the auxiliary communication device, the circuitry for inductive communication including a capacitor C and an inductor L configured in parallel to form an LC circuit having a resonant frequency; and
      a processor and memory, the processor configured to execute computer instructions stored in the memory to:
         receive the first message over the inductive communication link from the auxiliary communication device, the first message including an indication associated with the selected valve activation signal of the one or more valve activation signals, the indication based at least in part on the user input, the first message comprising a signal having a frequency approximately matching the resonant frequency of the LC circuit; and
         transmit a second message that includes the indication associated with the selected valve activation signal over the wireless communication link to the valve transceiver, wherein the valve transceiver is further configured to create an association between the selected irrigation valve and the selected activation signal based at least in part on the indication from the first message received over the inductive communication link from the auxiliary communication device.

2. The irrigation system of claim 1, wherein when the irrigation controller provides the selected activation signal, the controller transceiver is configured to transmit, over the wireless communication link, a third message that includes the indication of the selected activation signal to cause the valve transceiver to control the associated irrigation valve.

3. The irrigation controller of claim 2, wherein the valve transceiver is configured to receive, over the wireless communication link, the third message, decode the message, and control the associated irrigation valve responsive to the decoded message.

4. The irrigation system of claim 1, wherein the auxiliary communication device comprises a mobile communication device with a user interface.

5. The irrigation system of claim 1, wherein the inductive communication link between the controller transceiver and the auxiliary communication device is bi-directional.

6. The irrigation system of claim 1, wherein the wireless communication link between the controller transceiver and the valve transceiver is bi-directional.

7. A controller transceiver comprising:
   a wireless transceiver configured to be in communication with a valve transceiver over a wireless communication link, the valve transceiver configured to control a selected irrigation valve;
   communication circuitry for inductive communication configured to be in communication with an auxiliary communication device over an inductive communication link, the communication circuitry including a capacitor C and an inductor L configured in parallel to form an LC circuit having a resonant frequency; and
   a processor and memory, the processor configured to execute computer instructions stored in the memory to:
      receive one or more valve activation signals from an irrigation controller, each valve activation signal configured to control an associated irrigation valve;
      receive a first message over the inductive communication link from the auxiliary communication device, the first message including an indication associated with the selected activation signal of the one or more valve activation signals, the first message comprising a signal having a frequency approximately matching the resonant frequency of the LC circuit; and
      transmit a second message that includes the indication associated with the selected activation signal over the wireless communication link to the valve transceiver, the valve transceiver configured to create an association between the selected irrigation valve and the selected activation signal based at least in part on the indication from the first message received over the inductive communication link from the auxiliary communication device.

8. The controller transceiver of claim 7, wherein the inductive communication link between the controller transceiver and the auxiliary communication device is bi-directional.

9. The irrigation system of claim 8, wherein when the irrigation controller provides the selected activation signal, the controller transceiver is configured to transmit, over the wireless communication link, a third message that includes the indication of the selected activation signal to cause the valve transceiver to control the associated irrigation valve.

10. The irrigation controller of claim 9, wherein the valve transceiver is configured to receive, over the wireless communication link, the third message, decode the message, and control the associated irrigation valve responsive to the decoded message.

11. An irrigation system comprising:
   an irrigation controller configured to provide one or more valve activation signals, each valve activation signal configured to control an associated irrigation valve;
   a valve transceiver configured to control a selected irrigation valve; and an auxiliary communication device configured to receive user input and to send and receive first messages over an inductive communication link; and
   a controller transceiver configured to receive, from the irrigation controller, a selected activation signal of the one or more valve activation signals, the selected activation signal configured to control the selected irrigation valve, the controller transceiver comprising:
   a wireless transceiver in communication, over a wireless communication link, with the valve transceiver;
   communication circuitry for inductive communication in communication, over the inductive communication link, with the auxiliary communication device, the communication circuitry including a capacitor C and an inductor L configured in parallel to form an LC circuit having a resonant frequency; and
   a processor and memory, the processor configured to execute computer instructions stored in the memory to:
   exchange first messages over the inductive communication link with the auxiliary communication device, the first messages comprising signals having a frequency approximately matching the resonant frequency of the LC circuit, the first messages including indications associated with selected activation signals of the one or more valve activation signals, wherein the valve transceiver is configured to create associations between selected irrigation valves and the selected activation signals based at least in part on the indications received over the inductive communication link from the auxiliary communication device;
   wherein the processor is further configured to execute the computer instructions to exchange second messages over the wireless communication link with the valve transceiver.

12. The irrigation system of claim 11, wherein the first messages further include commands from the auxiliary communication device.

13. The irrigation system of claim 12, wherein the commands include one or more of a request for battery status of the valve transceiver unit, a request for integrity status of the wireless communication link, or a request to download firmware.

14. A method for irrigation control, the method comprising:
   providing, from an irrigation controller, one or more valve activation signals, each valve activation signal configured to control an associated irrigation valve;
   receiving, at an auxiliary communication device, user input, and sending, over an inductive communication link, a first message from the auxiliary communication device;
   receiving, at a controller transceiver, the first message over the inductive communication link from the auxiliary communication device, the controller transceiver including circuitry for inductive communication that includes a capacitor C and an inductor L configured in parallel to form an LC circuit having a resonant frequency, the first message including an indication associated with a selected activation signal of the one or more valve activation signals, the first message comprising a signal having a frequency approximately matching the resonant frequency of the LC circuit;
   transmitting a second message that includes the indication associated with the selected valve activation signal over a wireless communication link to a valve transceiver that controls a selected irrigation valve; and
   associating, based at least in part on the indication, the selected valve activation signal with the selected irrigation valve.

15. The method of claim 14, wherein the valve transceiver is further configured to create the association between the selected irrigation valve and the selected activation signal.

16. The method of claim 15 further comprising storing, at the controller transceiver, the association.

17. The method of claim 14 further comprising receiving at the controller transceiver the selected activation signal from the irrigation controller.

18. The method of claim 17 further comprising transmitting, after receiving the selected activation signal from the irrigation controller, a command to the valve transceiver over the wireless communication link, the command including the indication associated with the selected activation signal.

19. The method of claim 18 further comprising, at the valve transceiver, decoding the command and controlling the associated irrigation valve responsive to the decoded command.

* * * * *

UNITED STATES PATENT AND TRADEMARK OFFICE
CERTIFICATE OF CORRECTION

| | |
|---|---|
| PATENT NO. | : 11,871,710 B2 |
| APPLICATION NO. | : 17/444319 |
| DATED | : January 16, 2024 |
| INVENTOR(S) | : Peter John Woytowitz |

It is certified that error appears in the above-identified patent and that said Letters Patent is hereby corrected as shown below:

In the Drawings

Sheet 18 of 26, (Reference Numeral 2830) (FIG. 28), Line 2, delete "Commumication" and insert -- Communication --.

In the Specification

Column 8, Line 58, delete "and or" and insert -- and/or --.

Column 10, Line 58, delete "and or" and insert -- and/or --.

Column 18, Line 66, delete "wireles sly" and insert -- wirelessly --.

Column 20, Line 43, delete "events" and insert -- events. --.

In the Claims

Column 35, Line 8, Claim 9, delete "irrigation system" and insert -- controller transceiver --.

Column 35, Line 14, Claim 10, delete "irrigation controller" and insert -- controller transceiver --.

Column 35, Line 24, Claim 11, after "value;" delete "and".

Signed and Sealed this
Ninth Day of April, 2024

Katherine Kelly Vidal
*Director of the United States Patent and Trademark Office*